United States Patent
Ohta et al.

(10) Patent No.: US 7,106,911 B2
(45) Date of Patent: Sep. 12, 2006

(54) IMAGE PROCESSING APPARATUS AND CONTROL METHOD FOR INPUTTING IMAGE DATA AND ENCODING THE DATA

(75) Inventors: Ken-ichi Ohta, Kanagawa (JP); Tadayoshi Nakayama, Tokyo (JP); Hidefumi Osawa, Saitama (JP); Shinichi Kato, Kanagawa (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 10/171,647

(22) Filed: Jun. 17, 2002

(65) Prior Publication Data

US 2003/0002743 A1 Jan. 2, 2003

(30) Foreign Application Priority Data

Jun. 18, 2001 (JP) ............................. 2001-184129
Oct. 12, 2001 (JP) ............................. 2001-315670

(51) Int. Cl.
*G06K 9/36* (2006.01)
*G06K 1/00* (2006.01)

(52) U.S. Cl. .................................... 382/251; 358/1.16
(58) Field of Classification Search ................ 382/251; 358/1.16

See application file for complete search history.

(56) References Cited

U.S. PATENT DOCUMENTS

| | | | |
|---|---|---|---|
| 5,267,333 A | 11/1993 | Aono et al. | 382/56 |
| 5,291,282 A | 3/1994 | Nakagawa et al. | 348/384 |
| 5,402,248 A | 3/1995 | Sato et al. | 358/426 |
| 5,486,826 A | 1/1996 | Remillard | 341/51 |
| 5,543,844 A | 8/1996 | Mita et al. | 348/405 |
| 5,581,373 A | 12/1996 | Yoshida | 358/476 |
| 5,604,846 A * | 2/1997 | Kadota | 358/1.16 |
| 5,732,157 A | 3/1998 | Osawa | 382/244 |
| 5,757,965 A | 5/1998 | Ohki | 382/232 |
| 5,764,806 A | 6/1998 | Horiuchi et al. | 382/239 |
| 5,801,650 A | 9/1998 | Nakayama | 341/67 |
| 5,812,146 A | 9/1998 | Sato et al. | 345/501 |
| 5,818,970 A | 10/1998 | Ishikawa et al. | 382/248 |

(Continued)

FOREIGN PATENT DOCUMENTS

EP 0469835 A 2/1992

(Continued)

OTHER PUBLICATIONS

"60 to 140 Mbps Compatible HDTV Coding," Video Information, Jan. 1992, pp. 51-58.

*Primary Examiner*—Wenpeng Chen
(74) *Attorney, Agent, or Firm*—Fitzpatrick, Cella, Harper & Scinto

(57) ABSTRACT

An image input through an input unit is compressed by an encoding unit and stored in first and second memories. A first counter counts the data in its code amount. When the amount of encoded data generated reaches a predetermined size, an encoding sequence control unit sets quantization steps in the encoding unit and re-encoding unit to increase compression ratios. The encoding sequence control unit clears the first memory, causes the re-encoding unit to re-encode the encoded data stored in the second memory, and stores the resultant data in the first memory. Since the encoding unit continues encoding data with the set quantization step, the encoded data are stored in the first memory from the start of the image. Subsequently, every time the data amount stored in the first memory reaches a predetermined amount, the quantization step is increased, and the processing is repeated.

7 Claims, 28 Drawing Sheets

U.S. PATENT DOCUMENTS

| | | | | |
|---|---|---|---|---|
| 5,832,126 A * | 11/1998 | Tanaka | | 382/239 |
| 5,841,381 A | 11/1998 | Nakayama | | 341/67 |
| 5,861,892 A | 1/1999 | Sato et al. | | 345/435 |
| 5,917,947 A * | 6/1999 | Ishida et al. | | 382/232 |
| 5,982,937 A | 11/1999 | Accad | | 382/239 |
| 5,986,594 A | 11/1999 | Nakayama et al. | | 341/107 |
| 5,991,445 A | 11/1999 | Kato | | 382/232 |
| 5,991,449 A * | 11/1999 | Kimura et al. | | 382/238 |
| 5,991,515 A | 11/1999 | Fall et al. | | 395/114 |
| 6,020,975 A | 2/2000 | Chen et al. | | 358/1.16 |
| 6,061,473 A | 5/2000 | Chen et al. | | 382/235 |
| 6,167,160 A | 12/2000 | Osawa | | 382/247 |
| 6,195,024 B1 | 2/2001 | Fallon | | 341/51 |
| 6,233,355 B1 | 5/2001 | Kajiwara | | 382/238 |
| 6,408,102 B1 | 6/2002 | Nakayama | | 382/246 |
| 6,441,913 B1 | 8/2002 | Anabuki et al. | | 358/1.12 |
| 6,449,058 B1 * | 9/2002 | Ueda | | 358/1.16 |
| 6,552,819 B1 * | 4/2003 | Osawa et al. | | 358/1.17 |
| 6,560,365 B1 | 5/2003 | Nakayama et al. | | 382/233 |
| 6,643,405 B1 | 11/2003 | Sako | | 382/239 |
| 6,704,281 B1 | 3/2004 | Hourunranta et al. | | 370/230 |
| 6,792,153 B1 | 9/2004 | Tsujii | | 382/239 |
| 6,832,005 B1 | 12/2004 | Malvar | | 382/238 |
| 6,865,299 B1 | 3/2005 | Nakayama | | 382/246 |
| 6,952,501 B1 | 10/2005 | Nakayama | | 382/243 |
| 2002/0051230 A1 | 5/2002 | Ohta | | 358/448 |
| 2002/0078113 A1 | 6/2002 | Nakayama | | 708/300 |
| 2002/0090142 A1 | 7/2002 | Igarashi et al. | | 382/246 |
| 2002/0122599 A1 | 9/2002 | Igarashi et al. | | 382/239 |
| 2002/0154042 A1 | 10/2002 | Igarashi et al. | | 341/67 |
| 2002/0164080 A1 | 11/2002 | Igarashi et al. | | 382/233 |
| 2003/0031371 A1 | 2/2003 | Kato, et al. | | 382/239 |
| 2003/0058143 A1 | 3/2003 | Chiba, et al. | | 341/67 |
| 2003/0086597 A1 | 5/2003 | Ohta et al. | | 382/131 |
| 2003/0206659 A1 | 11/2003 | Hamanaka | | 382/239 |

FOREIGN PATENT DOCUMENTS

| | | |
|---|---|---|
| JP | 8-32037 B4 | 3/1996 |
| JP | 2523953 B2 | 8/1996 |
| JP | 2897563 B2 | 5/1999 |
| JP | 3038022 B2 | 8/2000 |

* cited by examiner

ENCODING/RE-ENCODING PHASE : II

TRANSFER PHASE: III

ENCODING/RE-ENCODING PHASE : II '

ENCODING PHASE : IV'

ENCODING PHASE (INITIAL STATE) : VI

ENCODING/RE-ENCODING PHASE : VIII

FIG. 20

| | Y(DC) | Y(AC) | C1(DC) | C1(AC) | C2(DC) | C2(AC) |
|---|---|---|---|---|---|---|
| 1 | UNSELECTED | UNSELECTED | UNSELECTED | SELECTED | UNSELECTED | SELECTED |
| 2 | UNSELECTED | SELECTED | UNSELECTED | UNSELECTED | UNSELECTED | UNSELECTED |
| 3 | UNSELECTED | UNSELECTED | UNSELECTED | SELECTED | UNSELECTED | SELECTED |
| 4 | UNSELECTED | UNSELECTED | UNSELECTED | UNSELECTED | UNSELECTED | SELECTED |
| 5 | SELECTED | UNSELECTED | SELECTED | UNSELECTED | SELECTED | UNSELECTED |
| 6 | SELECTED | SELECTED | SELECTED | SELECTED | SELECTED | SELECTED |
| 7 | SELECTED | SELECTED | SELECTED | SELECTED | SELECTED | SELECTED |
| 8 | SELECTED | SELECTED | SELECTED | SELECTED | SELECTED | SELECTED |

ENCODING OF DCi-DCi-1

FIG. 22C

GROUPING OF DC COMPONENT DIFFERENCE VALUES

| SSSS GROUP NUMBER | DC DIFFERENCE VALUE | NUMBER OF ADDITIONAL BITS |
|---|---|---|
| 0 | 0 | 0 |
| 1 | −1,1 | 1 |
| 2 | −3,−2,2,3 | 2 |
| 3 | −7..−4,4..7 | 3 |
| 4 | −15..−8,8..15 | 4 |
| 5 | −31..−16,16..31 | 5 |
| 6 | −63..−32,32..63 | 6 |
| 7 | −127..−64,64..127 | 7 |
| 8 | −255..−128,128..255 | 8 |
| THE REST IS OMITTED | | |

FIG. 22D

CODE TABLE FOR DC COMPONENT DIFFERENCE VALUES (e.g., FOR LUMINANCE)

| SSSS GROUP NUMBER | CODE |
|---|---|
| 0 | 00 |
| 1 | 010 |
| 2 | 011 |
| 3 | 100 |
| 4 | 101 |
| 5 | 110 |
| 6 | 1110 |
| 7 | 11110 |
| 8 | 111110 |
| | THE REST IS OMITTED |

QUANTIZED DCT COEFFICIENT

FIG. 25

GROUPING OF AC COEFFICIENTS

| SSSS | AC COEFFICIENT VALUE | NUMBER OF ADDITIONAL BITS |
|---|---|---|
| 0 | 0 | 0 |
| 1 | −1, 1 | 1 |
| 2 | −3, −2, 2, 3 | 2 |
| 3 | −7..−4, 4..7 | 3 |
| 4 | −15..−8, 8..15 | 4 |
| 5 | −31..−16, 16..31 | 5 |
| 6 | −63..−32, 32..63 | 6 |
| 7 | −127..−64, 64..127 | 7 |
| 8 | −255..−128, 128..255 | 8 |
| | THE REST IS OMITTED | |

FIG. 26

| NNNN RUN | SSSS SIZE | CODE LENGTH | | ADDITIONAL BIT | TOTAL |
|---|---|---|---|---|---|
| 0 | 0 | 4 | 1010 | | 4 |
| 0 | 1 | 2 | 00 | 1 | 3 |
| 0 | 2 | 2 | 01 | 2 | 4 |
| 0 | 3 | 3 | 100 | 3 | 6 |
| 0 | 4 | 4 | 1011 | 4 | 8 |
| 0 | 5 | 5 | 11010 | 5 | 10 |
| 0 | 6 | 7 | 1111000 | 6 | 13 |
| 0 | 7 | 8 | 11111000 | 7 | 15 |
| 0 | 8 | 10 | 1111110110 | 8 | 18 |
| 0 | 9 | 16 | 1111111110000010 | 9 | 25 |
| 0 | A | 16 | 1111111110000011 | 10 | 26 |
| 1 | 1 | 4 | 1100 | 1 | 5 |
| 1 | 2 | 5 | 11011 | 2 | 7 |
| 1 | 3 | 7 | 1111001 | 3 | 10 |
| 1 | 4 | 9 | 111110110 | 4 | 13 |
| 1 | 5 | 11 | 11111110110 | 5 | 16 |
| 1 | 6 | 16 | 1111111110000100 | 6 | 22 |
| 1 | 7 | 16 | 1111111110000110 | 7 | 23 |
| 1 | 8 | 16 | 1111111110000111 | 8 | 24 |
| 1 | 9 | 16 | 1111111110000101 | 9 | 25 |
| 1 | A | 16 | 1111111110001000 | 10 | 26 |

IMAGE PROCESSING APPARATUS AND CONTROL METHOD FOR INPUTTING IMAGE DATA AND ENCODING THE DATA

FIELD OF THE INVENTION

The present invention relates to an image processing apparatus having a function of compression-encoding image data within a predetermined code amount.

BACKGROUND OF THE INVENTION

Conventionally, as still image compression schemes, a JPEG scheme using discrete cosine transform and a scheme using Wavelet transform are used in many cases. An encoding scheme of this type is a variable-length encoding scheme, and hence the code amount changes for each image to be encoded.

According to the JPEG scheme as an internal standardization scheme, only one quantization matrix can be defined for an image. If, therefore, this scheme is applied to a system which cannot adjust a code amount without prescan and stores codes in a limited memory, a memory overflow may occur.

In order to prevent this, conventional schemes used a method of re-reading an original upon changing the compression ratio when the actual code amount exceeds an expected code amount, a method of estimating a code amount in advance by prescan and re-setting quantization parameters to adjust the code amount, and the like.

As a code amount control scheme using prescan, for example, a scheme of storing pre-compressed data in an internal buffer memory, decompressing the data, full-compressing it upon changing the compression parameter, and outputting the resultant data to an external memory is available. In this case, the compression ratio in full-compression is higher than that in pre-compression.

Another scheme is known, in which an allowable code amount for each pixel block is obtained, and the coefficients obtained by level-shifting DCT coefficients n times are Huffman-encoded to reduce the code amount. This shift amount n is determined from the allowable code amount.

Conventionally, however, a compression buffer with a capacity larger than a target compression capacity is required as a compression buffer, and a buffer having a capacity large enough to record original image data is inevitably required to prevent an overflow in an intermediate buffer.

In addition, in the method of repeating encoding operation, since decoding and re-compression operations are performed for the overall compressed data, an increase in the speed of continuous processing cannot be expected.

SUMMARY OF THE INVENTION

The present invention has been made in consideration of the above prior art, and has as its object to provide an image processing apparatus which can effectively generate encoded data within a set size by inputting image data once, a control method for the apparatus, a computer program, and a storage medium.

According to the present invention, the foregoing object is attained by providing an image processing apparatus for inputting image data and compression-encoding the data, comprising: first compressing means which can change a parameter for determining a compression ratio; second compressing means which can change a parameter for determining a compression ratio, decodes encoded data compressed by the first compressing means, and re-compresses the data; monitoring means for monitoring a code data amount while image data of an input page is compressed by the first compressing means, and determining whether the code data amount has reached a predetermined amount; setting means for, when the monitoring means detects that the code data amount has reached the predetermined amount during compression of the page, setting a parameter for increasing a compression ratio in the first and second compressing means; and control means for, when the parameter is changed by the setting means, causing the second compressing means to re-encode encoded data generated by the first compressing means before the parameter is changed, storing the re-encoded data as encoded data after the parameter in the first compressing means is changed, and storing the encoded data generated by the first encoding means after the parameter is changed as succeeding encoded data.

In order to achieve the above object, the image processing apparatus of the present invention has the following arrangement.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 20 is a view showing the contents of a scenario table at the time of a memory overflow in the third embodiment;

FIGS. 22A to 22D are view for explaining the operation of a structure for encoding direct current components in the third embodiment;

FIG. 25 is a view showing a table for grouping alternating current components;

FIG. 26 is a view showing part of a Huffman code table to be looked up with a run length and size.

DETAILED DESCRIPTION OF THE PREFERRED EMBODIMENTS

The embodiments of the present invention will be described in detail below with reference to the accompanying drawings.

Figure 1:
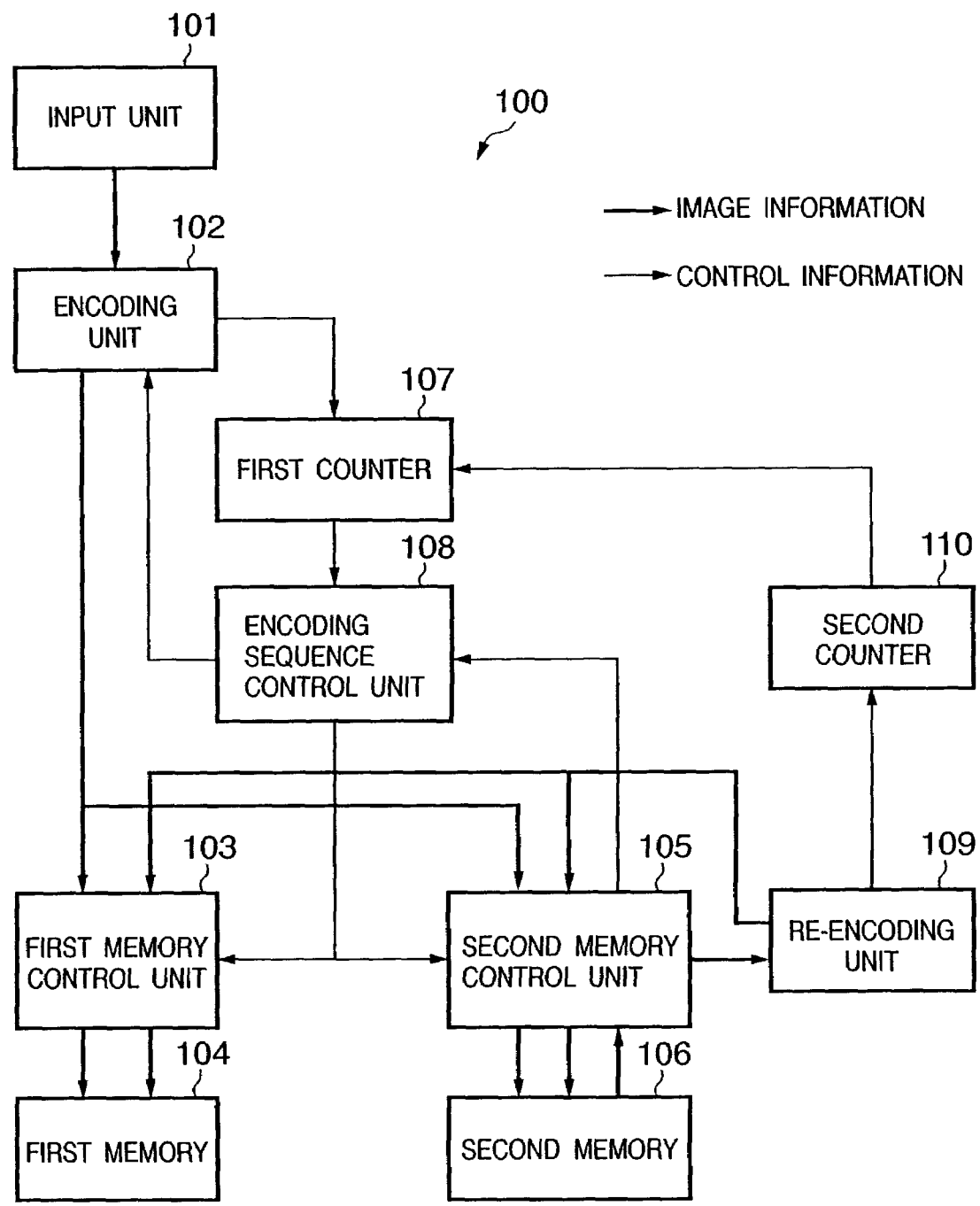
FIG. 1 is a block diagram showing the arrangement of an image processing apparatus according to the first embodiment.

FIG. 1 is a functional block diagram of an image processing apparatus 100 according to an embodiment.

The image processing apparatus 100 in this embodiment includes an input unit 101 for inputting an image from an image scanner. In this embodiment, in particular, a scanner designed to continuously read images is assumed to be used. However, the input unit 101 may input image data by page description language rendering or read image files stored in a storage medium. In some case, the input unit 101 may receive image data from a network.

An encoding unit 102 encodes the input image data on a frame (page) basis. Note that in this embodiment, a known JPEG encoding scheme is used as an encoding scheme. In addition, the image data is subjected to orthogonal transformation on an 8×8 pixel basis, and the resultant data is subjected to quantization using an quantization step (to be described later) and Huffman encoding processing.

A first memory control unit 103 and second memory control unit 105 perform control so as to store the above encoded data (identical encoded data) output from the encoding unit 102 in a first memory 104 and second memory 106, respectively. In this case, the first memory 104 is a memory for holding the finally confirmed (compressed within a target data amount) encoded data to allow it to be output to a network device, image output apparatus, large-capacity storage apparatus, and the like externally connected to the basic arrangement shown in FIG. 1. The second memory 106 is a work memory for aiding in compression encoding to form the encoded data in the first memory.

A counter 107 counts the data amount of image data compression-encoded by the encoding unit 102, and holds the count value. The counter 107 also outputs the count result to an encoding sequence control unit 108 for controlling an encoding sequence.

The encoding sequence control unit 108 detects on a page basis whether the count value of the counter 107 has reached a set value (target value). Upon detecting that the count value has reached (exceeded) the set value of the encoded data length of one page, the encoding sequence control unit 108 outputs a control signal to the first memory control unit 103 so as to discard the data stored in the first memory 104. The first memory control unit 103 discards the stored data by clearing the memory address counter or encoded data management table on the basis of this control signal. At this time, the encoding sequence control unit 108 clears the counter 107 to zero (continuously inputting data from the input unit 101), and also controls the encoding unit 102 to encode data at a higher compression ratio. That is, the encoding sequence control unit 108 performs control to finally reduce the data amount of encoded data generated by encoding processing in this apparatus to ½. Obviously, this value can be set to an arbitrary value other than ½.

The encoded data (portion of (n~100) % of one page) obtained after the compression ratio is changed is also stored in the first and second memories 104 and 106 through the first and second memory control units 103 and 105.

Furthermore, the encoding sequence control unit 108 causes the second memory control unit 105 to read out the encoded data (portion of (0~n ) % of one page) stored in the second memory 106, and outputs a control signal to a re-encoding unit 109 serving as an encoded data converting means so as to output the encoded data.

The re-encoding unit 109 decodes (performs only entropy decoding) the input encoded data and performs re-quantization (deletion of lower bits of each quantized value) to reduce the data amount. The re-encoding unit 109 then performs encoding processing (entropy encoding) again and outputs a data amount with the same compression ratio as that of the encoding unit 102, which has been changed, to a second counter 110.

The encoded data output from this re-encoding unit 109 is stored in the first and second memories 104 and 106 through the first and second memory control units 103 and 105.

The second memory control unit 105 detects whether re-encoding processing is terminated. More specifically, when there is no data to be read out for re-encoding processing, the second memory control unit 105 notifies the encoding sequence control unit 108 of the end of the re-encoding processing. In practice, the encoding processing is completed when the processing by the re-encoding unit 109 is terminated as well as the read processing by the second memory control unit 105.

The count value obtained by the second counter 110 is added to the counter value held in the counter 107 upon completion of the re-encoding processing. This addition result indicates the sum of data amounts in the first memory 104 immediately after the completion of the re-encoding processing. That is, when the encoding processing for one frame (page) is completed by the encoding unit 102 and re-encoding unit 109, the counter value held in the first counter 107 after the above addition indicates the total amount of data generated when this apparatus encoded 1-frame data (to be described in detail later).

The encoding unit 102 continuously performs encoding processing as long as image data from the input unit 101, which should be encoded, is left, regardless of whether re-encoding processing is terminated or not terminated.

Whether the count value of the first counter 107 has reached a given set value is repeatedly checked until encoding processing (encoding and re-encoding) of 1-frame (page) image data input from the input unit 101 is terminated. The above encoding/re-encoding processing is executed in accordance with control operation corresponding to the detection result obtained in this operation.

Figure 8:
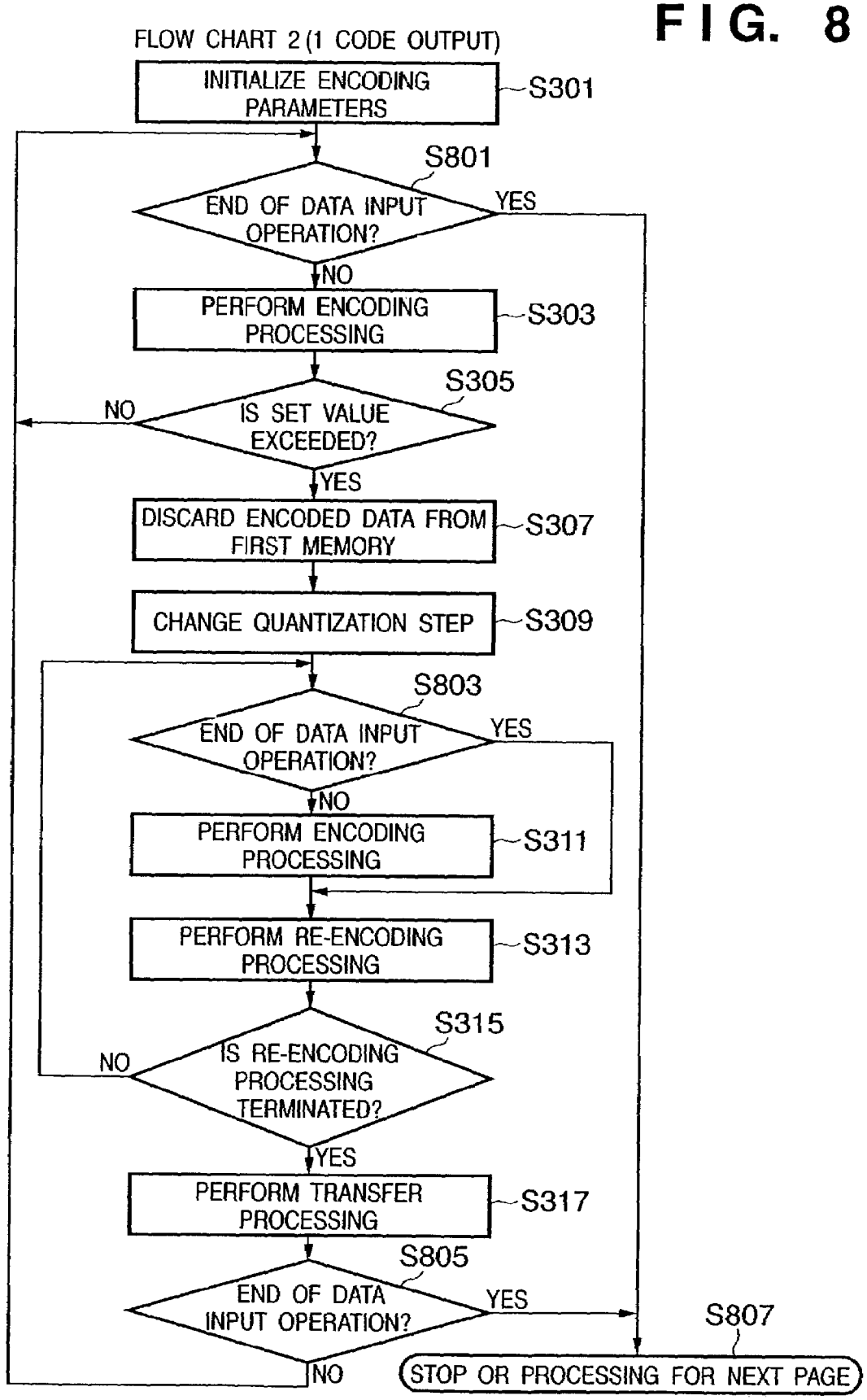
FIG. 8 is a flow chart showing the details of the processing in the first embodiment.

FIG. 8 is a flow chart showing the flow of processing in the arrangement shown in FIG. 1. For the sake of descriptive convenience, this processing will be described first with reference to the simplified flow chart of FIG. 3.

As has already been described, the image processing apparatus 100 of the present invention is designed to compression-encode 1-frame (page) image data input from input unit 101 such as a scanner into data of a predetermined data amount or less. In order to realize this encoding processing, the apparatus includes the encoding unit 102, re-encoding unit 109, first memory 104, second memory 106, and the like as well as the input unit 101. Encoding processing is performed by using these functional blocks in accordance with the flow chart shown in FIG. 3.

Figure 3:
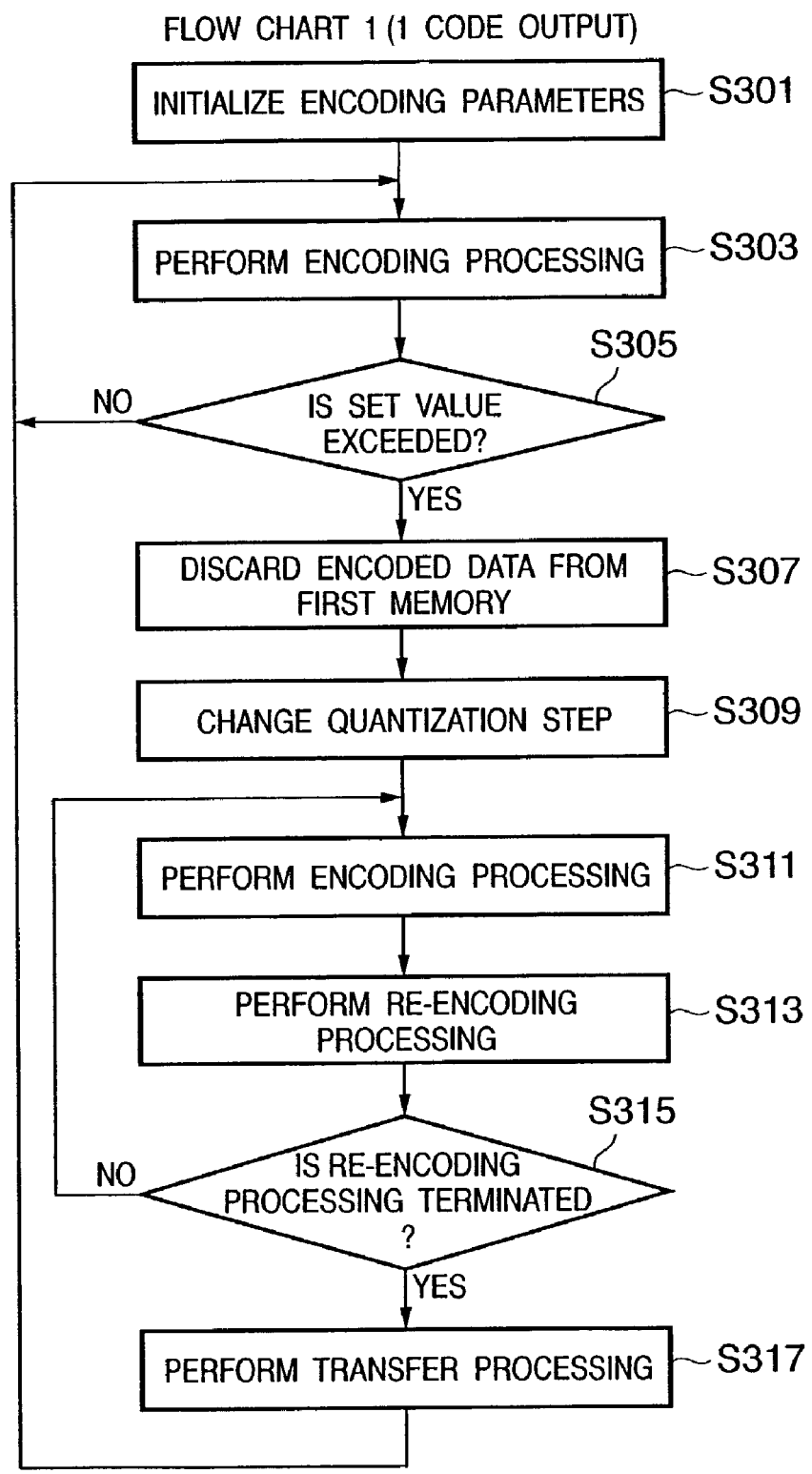
FIG. 3 is a flow chart simply showing the processing in the first embodiment.

The flow chart of FIG. 3 is roughly divided into the following three processing phases:

(1) an encoding phase,
(2) an encoding/re-encoding phase, and
(3) a transfer phase.

FIGS. 4 to 7 visually and simply show how image data, encoded data, and the like flow and are processed and how they are stored in the memories in the respective processing phases.

Figure 4:
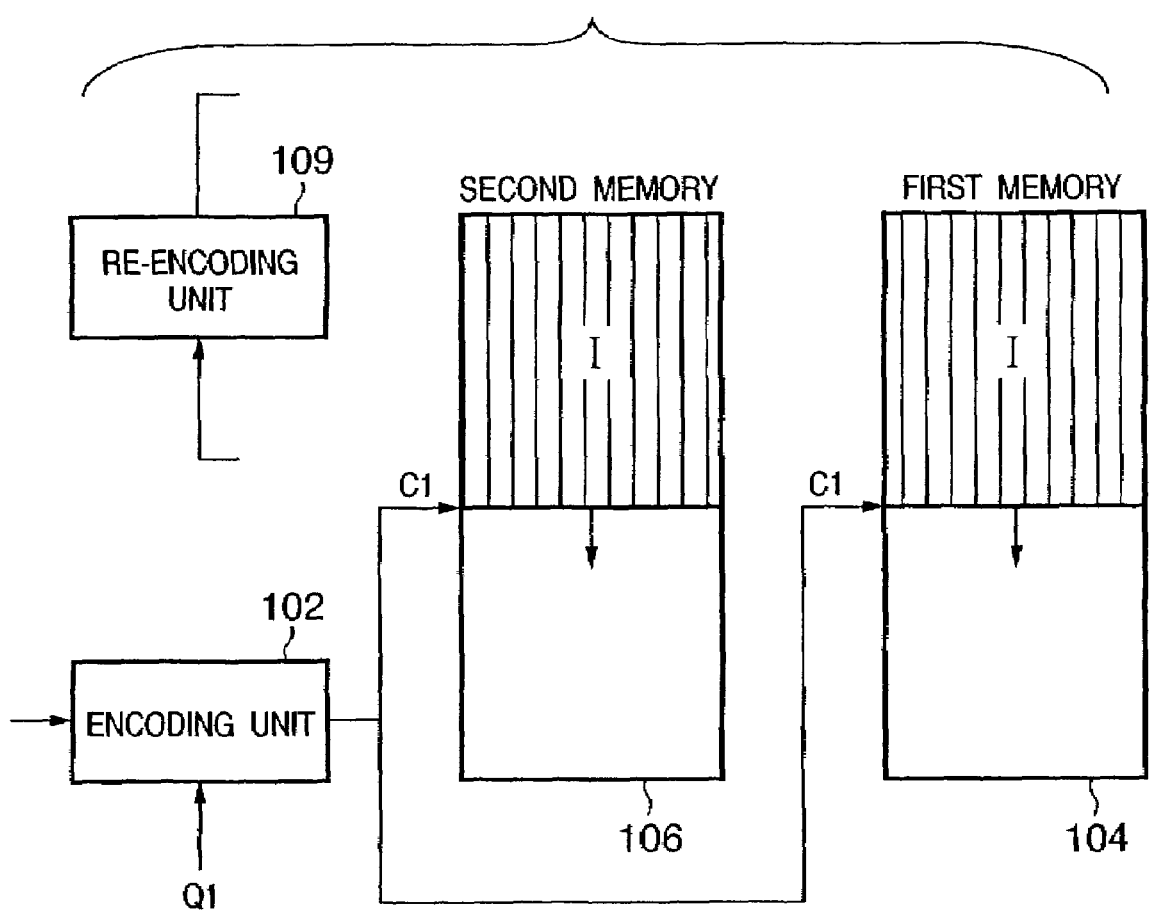
FIG. 4 is a view showing a data flow and the contents of memories in an encoding phase in the initial state in the first embodiment.
Figure 5:
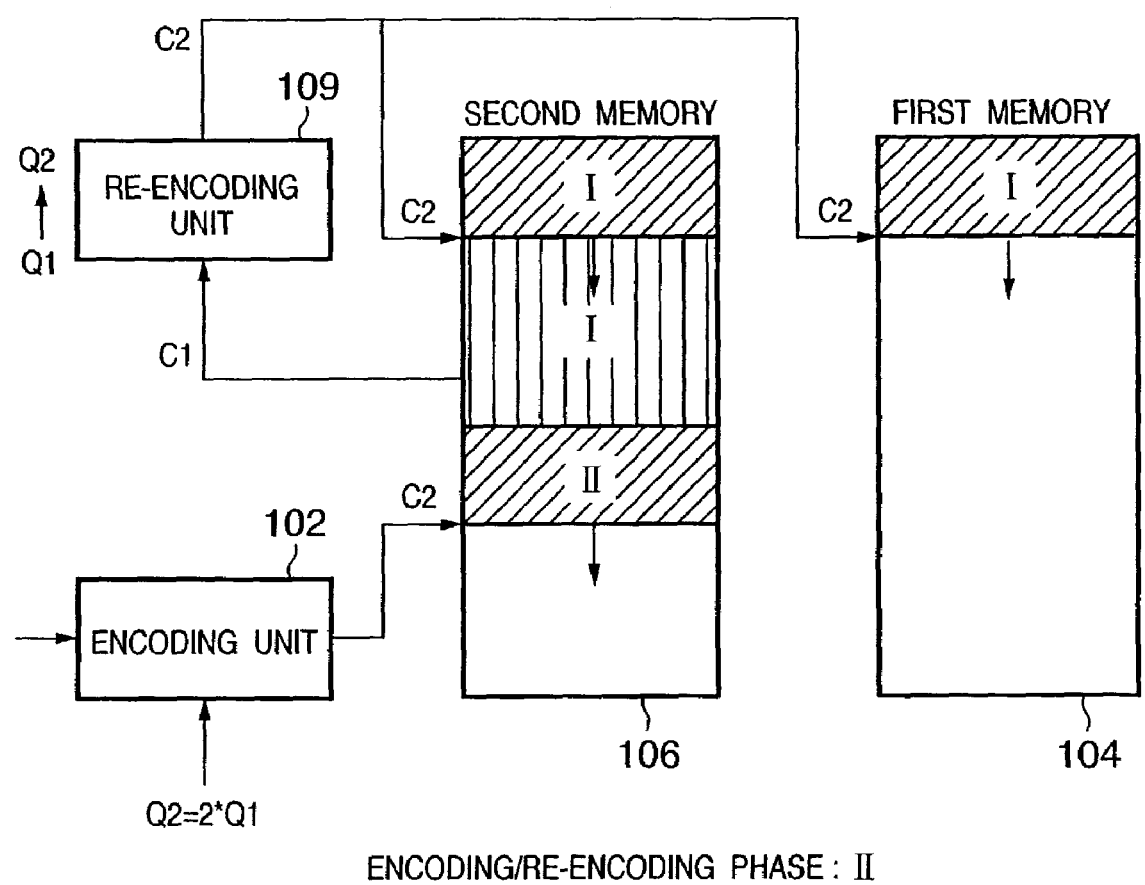
FIG. 5 is a view showing a data flow and the contents of the memories in an encoding/re-encoding phase in the first embodiment.
Figure 6:
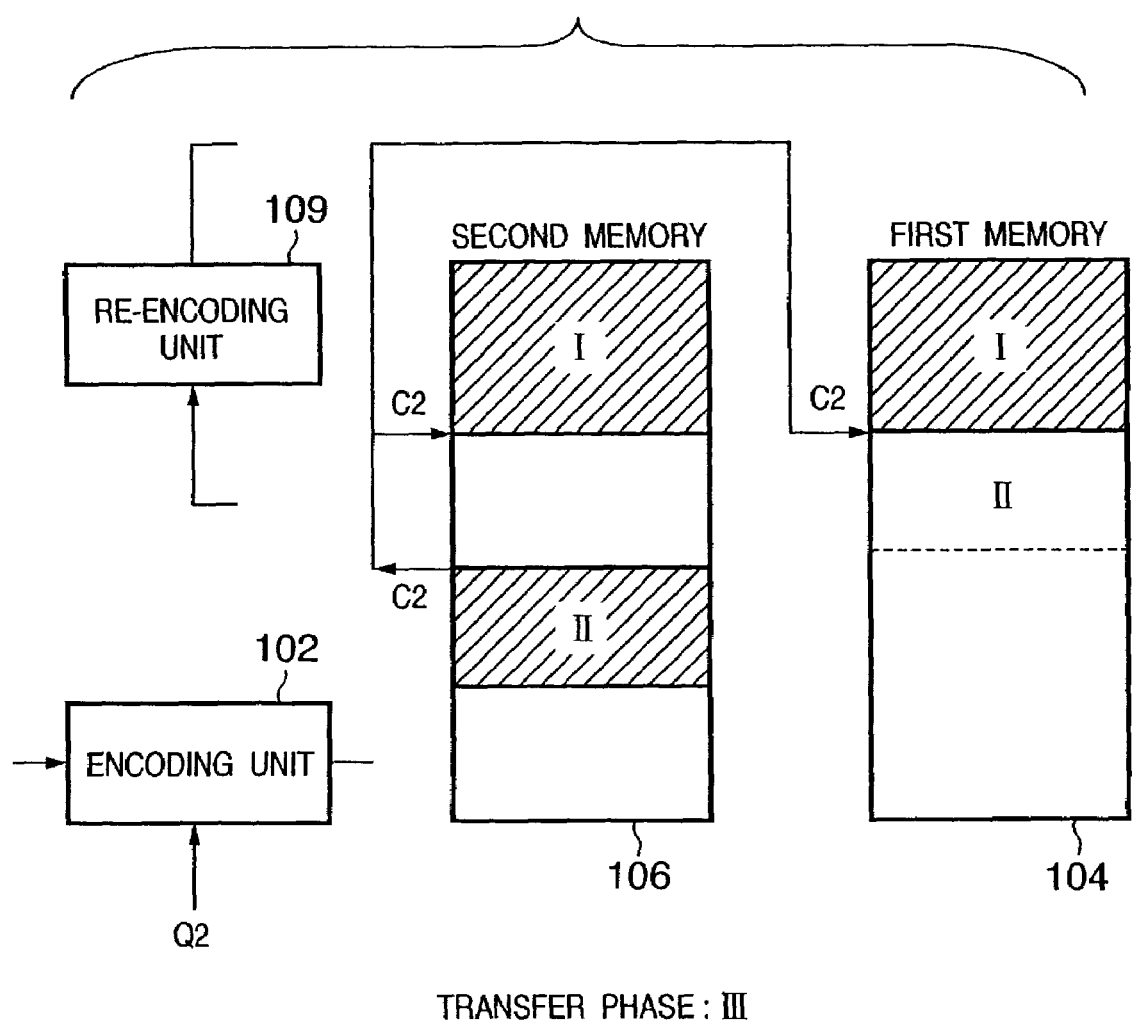
FIG. 6 is a view showing a data flow and the contents of the memories in a transfer phase in the first embodiment.
Figure 7:
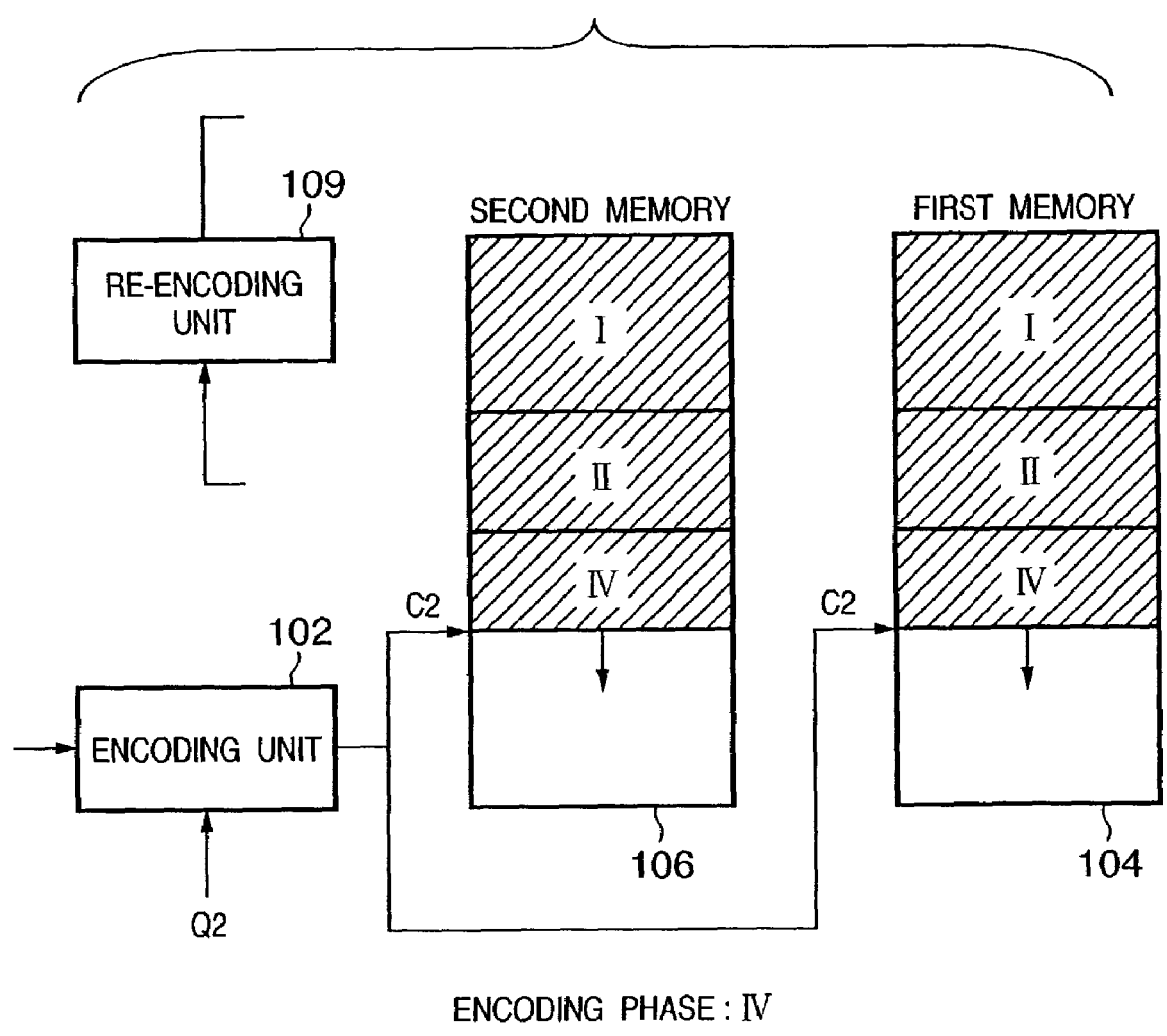
FIG. 7 is a view showing a data flow and the contents of the memories in an encoding phase after the transfer phase in the first embodiment.

FIG. 4 shows the initial state of the encoding phase corresponding to steps S303 and S305 in the flow chart of FIG. 3. FIG. 5 shows the processing state of the encoding/re-encoding phase corresponding to steps S307 to S315 in FIG. 5. FIG. 6 shows the processing state of the transfer phase corresponding to step S317. FIG. 7 shows the processing state of the encoding phase after the transfer phase. Each phase will be described below.

<<Encoding Phase>>

Encoding processing of 1-page image data starts from the initialization of encoding parameters (step S301). In this case, parameters to be set include the upper limit of an encoded data amount which is uniquely determined from the size of an image subjected to encoding processing (the size of a paper sheet read from the input unit 101) and a quantization step (Q1) applied to the encoding unit 102 (assume that in this embodiment, the unit 102 uses a known JPEG encoding scheme) are set, and the like.

In step S303, actual encoding processing (JPEG compression on an 8×8 pixel basis) is performed, and the first counter 107 cumulatively counts the data amounts of encoded data output.

In step S305, it is checked whether the count value of the data amounts has exceeded the above upper limit. If NO in step S305, the JPEG encoding processing in step S303 is continued. This is the encoding phase in the initial state.

The encoded data output from the encoding unit 102 is stored in both the first and second memories 104 and 106, as shown in FIG. 4. The areas indicated by the vertical stripes express the stored codes.

<<Encoding/Re-encoding Phase>>

As encoding processing by the encoding unit 102 proceeds and the count value of the data amounts exceeds the set upper limit, the encoded data in the first memory 104 is discarded in step S307. In addition, the quantization step of the encoding unit 102 is changed to Q2 in step S309.

That the count value of the data amounts of encoded data exceeds the set upper limit indicates that the data amount after compression falls outside a target value. Since it is useless to continue encoding processing by using the same quantization step, the quantization step is changed to the quantization step Q2, which is larger in quantization step width than the quantization step Q1, so as to further reduce the data amount.

After the quantization step is changed, the encoding processing by the encoding unit 102 is resumed in step S311, and the encoded data is stored only in the second memory 106, as shown in FIG. 5. Concurrently with this operation, the re-encoding processing in step S313 is performed. If a plurality of pages are to be continuously processed, parallel processing in steps S311 and S313 becomes a very important feature of the present invention. This makes it possible to generate encoded data constituted by the (0~n) % portion (re-encoded data) and (n~100) % portion (non-re-encoded data) of one page at high speed. In the re-encoding processing, the encoded data that has already been stored in the second memory 106 is read out, and the re-encoding unit 109 re-encodes the data and stores the encoded data in the two memories 104 and 106. The encoding processing and re-encoding processing are continuously performed until all the codes indicated by vertical stripes I are re-encoded. The re-encoded data output from the re-encoding unit 109 is the same encoded data as that obtained by encoding with the same quantization step as that for the encoded data output from the encoding unit 102 after the quantization step is changed.

More specifically, in this re-encoding processing, bit shift processing is performed for each quantized value obtained by temporarily Huffman-decoding encoded data so as to obtain the same result as that obtained by dividing each value by $2^n$. After this operation, Huffman encoding is performed again. This method allows high-speed re-encoding processing because the quantization step is changed by bit shift alone and neither inverse orthogonal transformation nor re-orthogonal transformation is performed. The end of the re-encoding processing is detected in step 315.

Since the data amount after re-encoding becomes smaller than the data amount of encoded data before re-encoding, the re-encoded data can be overwritten on the memory area where the codes before re-encoding are stored. At the end of the re-encoding processing, the data amount of encoded data indicated by the vertical stripes I is reduced to the data amount of encoded data indicated by oblique stripes I in FIG. 6.

Steps S307 to S315 described above are processing performed in the encoding/re-encoding phase.

<<Transfer Phase>>

When re-encoding processing is terminated, transfer processing is performed in step S317. In this transfer processing, as shown in FIG. 6, the encoded data indicated by oblique stripes II which is stored only in the second memory 106 in the encoding/re-encoding phase is transferred to an address where the data is concatenated to the encoded data indicated by the oblique stripes I in the first memory 104, and stored at the address. Meanwhile, the encoded data indicated by the oblique stripes II is transferred into the second memory 106 to be concatenated such that the encoded data indicated by the oblique stripes I and the encoded data indicated by the oblique stripes II, which are scattered in the second memory 106, are continuously stored in the first memory 104. This processing is done in the transfer phase.

When the above transfer phase is terminated, the flow returns to the encoding phase in steps S303 and S305 to output the codes indicated by oblique stripes IV in FIG. 7 from the encoding unit 102 and store the codes in the two memories 104 and 106. In this encoding phase, unlike in the encoding phase in the initial state (FIG. 4), the quantization step is changed from Q1 to Q2 in encoding data by using the encoding unit 102, and the encoded data stored in the two memories 104 and 106 are a set of codes processed in various phases. If these differences are neglected, the encoding phase immediately after the transfer phase can be regarded identical to the encoding phase in the initial state.

By repeating the three phases, i.e., the encoding phase, encoding/re-encoding phase, and transfer phase, the codes obtained by compressing 1-page image data into a set data amount or less can be stored in the first memory. In addition, the input unit 101 only continues input operation until the end of a series of operations. That is, an image need not be input again from the beginning.

The flow chart shown in FIG. 3 describes only processing corresponding to the respective phases shown in FIGS. 4, 5, and 6. In practice, however, inputting of 1-page image data comes to an end in some phase. Depending on the phase where the inputting operation comes to an end, the subsequent processing slightly differs. The flow chart of FIG. 8 shows the flow of processing in consideration of this. The flow chart shown in FIG. 8 is based on the relationship between the completion of inputting of 1-page image data and each kind of processing described with reference to FIG. 3. In this case, steps S801, S803, S805, and S807 are added to the flow chart of FIG. 3.

In steps S801, S803, and S805, it is checked whether inputting of 1-page image data from the input unit 101 is completed in the encoding phase, encoding/re-encoding phase, and transfer phase.

If it is detected that inputting of 1-page image data is completed in the encoding phase and transfer phase (steps S801 and S805), the flow advances to step S807 to terminate compression encoding processing for the page. If there is 1-page image data or more to be processed next, compression encoding processing for the next 1-page image data is started. If there is no data to be processed, a halt condition is set.

If the end of inputting of 1-page image data is detected in the encoding/re-encoding phase (step S803), the operation of the encoding unit 102 needs to be stopped until there is no image data to be re-encoded. For this reason, the encoding processing in step S311 is passed, and only the re-encoding processing is continued in step S313 to suppress the image data that has already been encoded by the encoding unit 102 within a predetermined encoded data amount. If the subsequent transfer processing is not terminated after all the re-encoding processing is terminated, the overall encoded data of 1-page image data is not collected in the first memory, re-encoding processing and subsequent transfer processing must be continuously performed after the end of inputting of 1-page image data. In this case, if it is detected in step S315 that all the re-encoding processing is terminated, the encoded data stored only in the second memory 106 is transferred to the first memory during the encoding/re-encoding phase (step S317). Thereafter, in step S805, the end of inputting of 1-page image data is detected. The flow then advances to step S807.

The above description has been made on operation in this embodiment and the operation in FIG. 8.

<Modification of Memory Storage Method>

Figure 9:
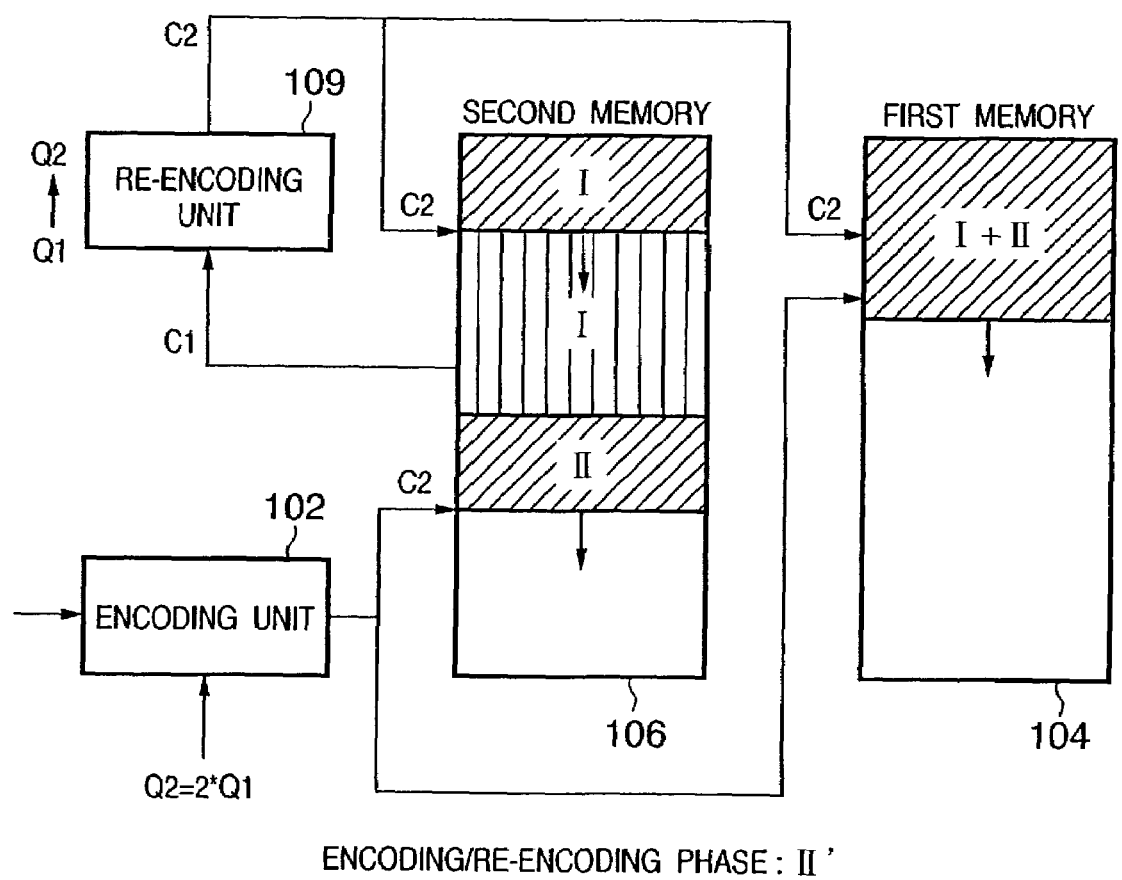
FIG. 9 is a view showing a data flow and the contents of the memories in an encoding/re-encoding phase in a modification of the first embodiment.
Figure 10:
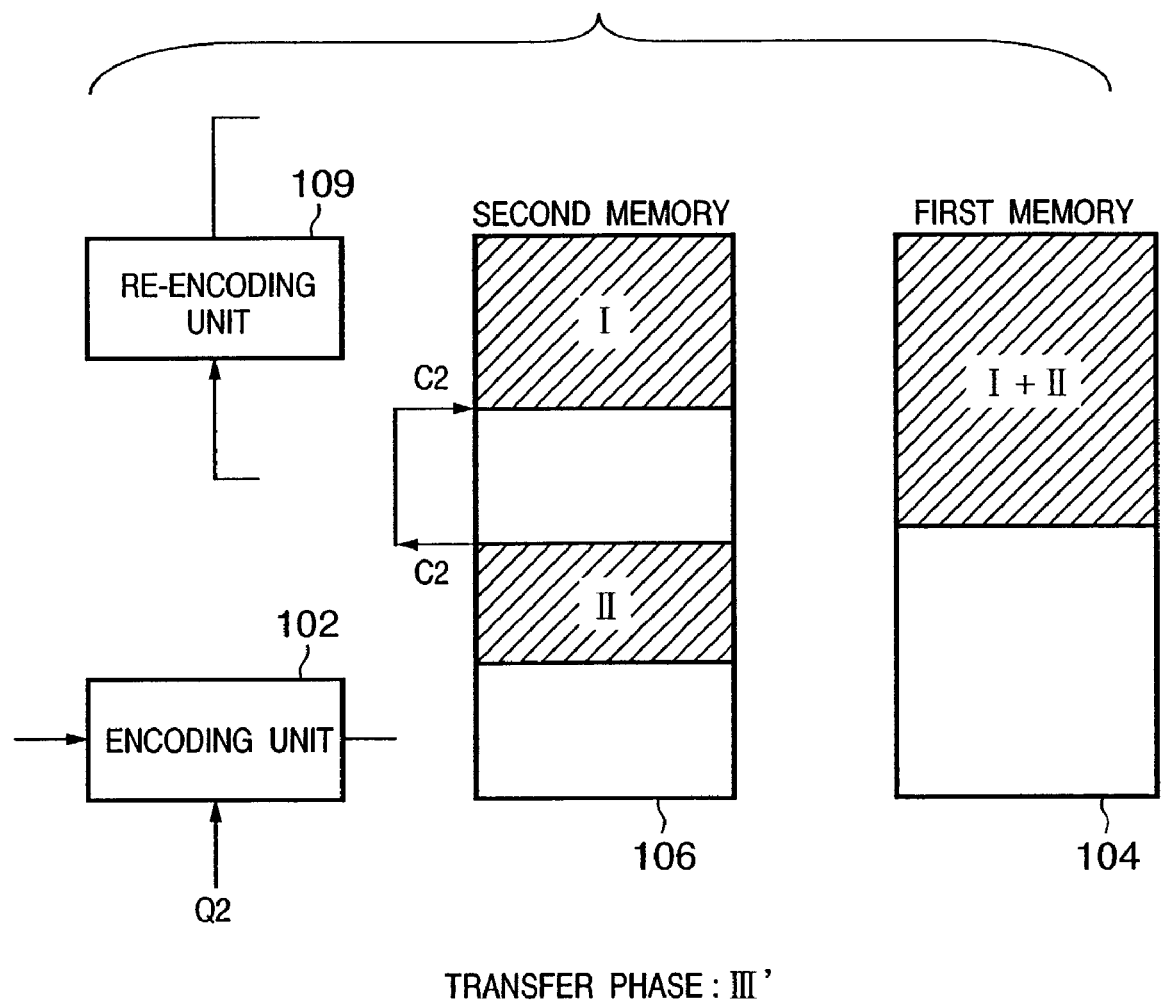
FIG. 10 is a view showing a data flow and the contents of the memories in a transfer phase in the modification of the first embodiment.

FIGS. 9 and 10 are views showing a modification of the memory storage method indicated by the conceptual views of FIGS. 5 and 6.

Referring to the conceptual view of FIG. 5, in the encoding/re-encoding phase, the encoded data output from the encoding unit 102 is stored only in the second memory 106. As shown in FIG. 9, however, in the encoding/re-encoding phase, the encoded data output from the encoding unit 102 is directly stored in both the first and second memories.

When viewed from the encoding unit 102, the data encoded in any phase and output is stored in the two memories. Unlike the conceptual view of FIG. 6, there is no need to perform data transfer between the memories in the transfer phase, as shown in FIG. 10. In addition, according to this modification, in the encoding/re-encoding phase, encoded data and re-encoded data are sequentially stored in the first memory 104 in the order in which they are transferred. For this reason, two types of data are mixed.

In this modification, in order to solve this problem, encoded data is divided into certain unit data to be managed as files or packets. More specifically, such unit data are managed by separately forming, for example, a file management table or packet management table.

According to one technique, when data from the encoding unit 102 is to be stored in the first memory 104, management numbers are assigned to the image data from the start per appropriate unit data (for example, 8×i (i=integers 1, 2, . . . )-line data because the unit of orthogonal transformation is 8×8 blocks), and a management table is formed, which can store the storage start addresses of encoded data corresponding to the respective management numbers and the corresponding encoded data amounts in the management number order.

The encoding unit 102 and re-encoding unit 109 hold the management numbers of data under processing and write the storage start address of the encoded data and the encoded data amounts in the management table on the basis of the management numbers. With this operation, even if the encoded data processed by the encoding unit 102 and re-encoding unit 109 are stored at random, the encoded data can be sequentially read out from the first memory 104 from the start of the image by accessing the management table in the management number order and reading out the data on the basis of the start addresses and encoded data amount read out at this time. Such a management mechanism will eliminate the necessity to store the continuous data of an image in a memory in the continuous order.

Figure 11:
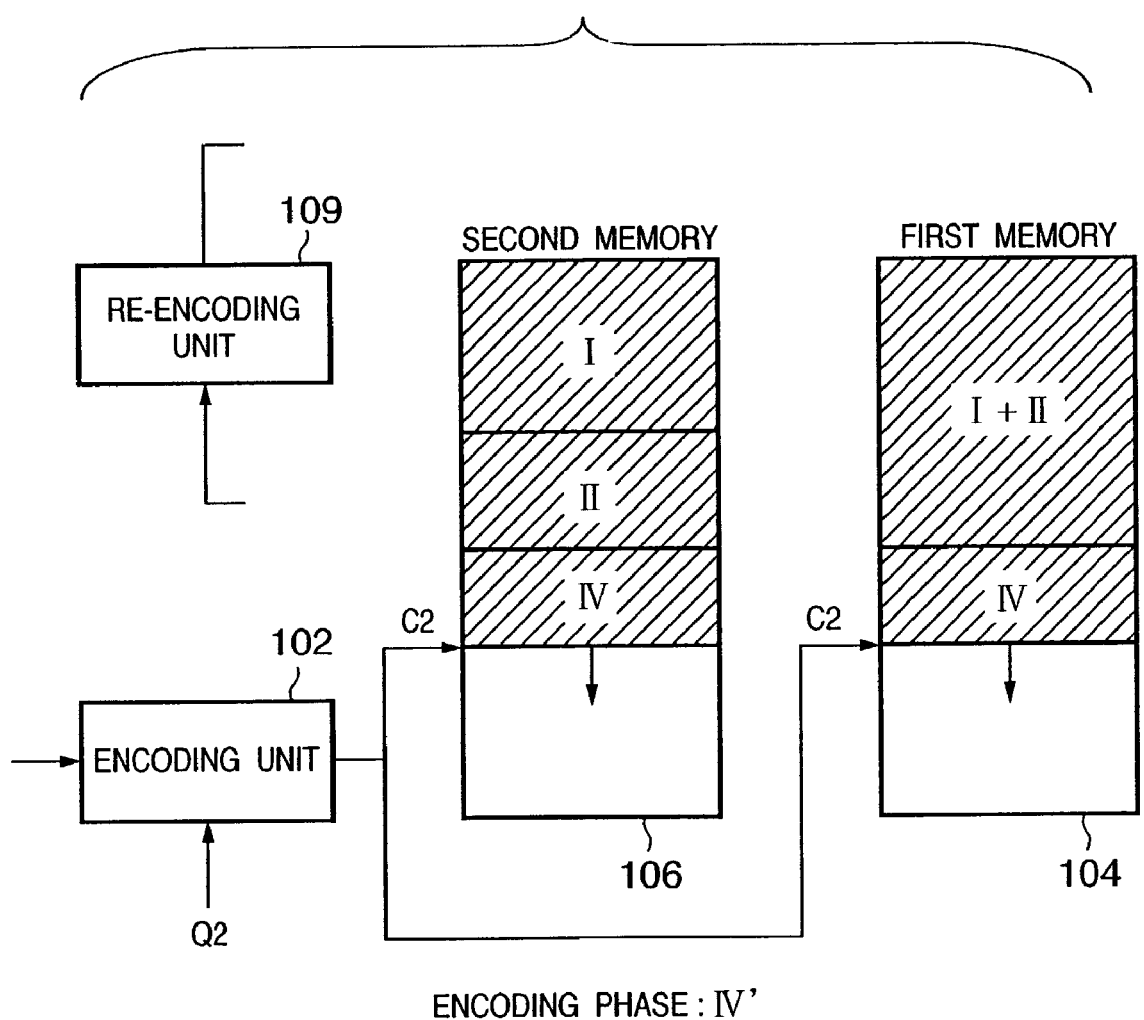
FIG. 11 is a view showing a data flow and the contents of the memories in an encoding phase after the transfer phase in the modification of the first embodiment.

The encoding phase after the transfer phase in the conceptual view of FIG. 10 is almost the same as the two encoding phases described above (FIGS. 4 and 7) except that the stored state of codes in the first memory slightly differs from that shown in FIG. 11. Therefore, the preceding description and this modification are the same in terms of repeating the three phases.

Second Embodiment

The second basic arrangement for performing encoding processing characteristic to the present invention will be described below with reference to FIG. 2.

Figure 2:
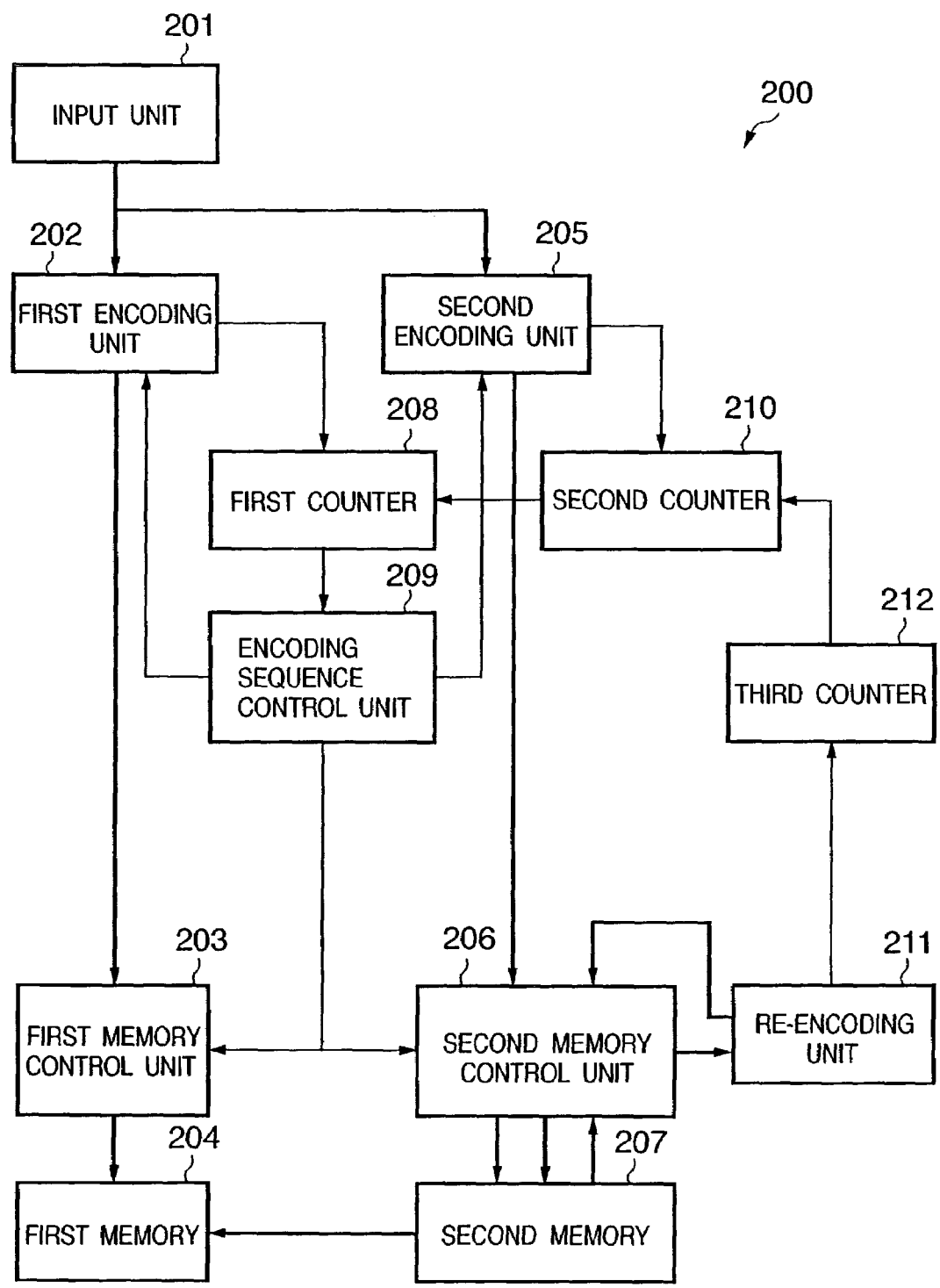
FIG. 2 is a block diagram showing the arrangement of an image processing apparatus according to the second embodiment.

FIG. 2 is a block diagram showing an image processing apparatus 200 according to the second embodiment.

The image processing apparatus 200 greatly differs from the image processing apparatus 100 in FIG. 1 in that two encoding units for performing encoding first are connected in parallel with each other. The image processing apparatus 200 generates two types of encoded data with different compression ratios by making first and second encoding units 202 and 205 concurrently encode the image data input from an input unit 201. In this embodiment as well, a known JPEG encoding scheme is used as an encoding scheme, image data is subjected to orthogonal transformation on an 8×8 pixel basis, and the resultant data is subjected to quantization using a quantization step (to be described later) and Huffman encoding processing.

Note that the second embodiment will exemplify the case wherein a higher compression ratio is set for the second encoding unit 205 than for the first encoding unit 202. More specifically, let Q1 be the quantization step in the first encoding unit 202, and Q2 (=2×Q1) be the quantization step in the second encoding unit 205.

The encoded data output from the first encoding unit 202 is stored in a first memory 204 through a first memory control unit 203. At this time, a first counter 208 counts the data amount of encoded data output from the first encoding unit 202 and stores it, and outputs it to an encoding sequence control unit 209.

The data encoded by the second encoding unit 205 is stored in a second memory 207 through a second memory control unit 206. At this time, a second counter 210 counts the data amount of encoded data output from the second encoding unit 205 and holds it. When the encoded data stored in the second memory 207 is transferred to the first memory 204, the second counter 210 transfers the above count value to the first counter 208.

When the count value of the first counter 208 reaches a certain set value while the counter 208 is counting the data amount of the encoded data output from the first encoding unit 202, the encoding sequence control unit 209 outputs a control signal to the first memory control unit 203 so as to discharge the data stored in the first memory 204 as in the first embodiment.

The encoding sequence control unit 209 then outputs control signals to the memory control unit 206 and memory control unit 203 so as to read out the encoded data stored in the second memory 207 and transfers it to the first memory 204. As a consequence, the count value of the second counter 210 is transferred to the first counter 208, and the value is loaded (overwritten) as the count value of the first counter.

In short, since the count value of the second counter 210 represents the data amount of encoded data stored in the second memory 207, it can be considered that the count value and encoded data are directly copied to the first counter and first memory without changing their correspondence.

In addition, the encoding sequence control unit 209 outputs control signals to the first encoding unit 202 and second encoding unit 205 to encode data so as to reduce the data amount.

For example, a quantization step S in the first encoding unit 202 and second encoding unit 205 is doubled. As a result, the first encoding unit 202 uses the quantization step Q2 (=2×Q1) in the second encoding unit 205, whereas the second encoding unit 205 performs encoding processing with a high compression ratio in consideration of the next overflow by using a larger quantization step Q2×2.

In this case, the magnification ratio between the two quantization steps is set to two. Obviously, however, the magnification ratio can be set to an arbitrary value. The encoded data output from the respective encoding units 202 and 205 upon switching of quantization steps are respectively stored in the corresponding memories 204 and 207 through the corresponding memory control units 203 and 206.

The encoding sequence control unit 209 outputs a control signal to the memory control unit 206 to read out the encoded data that has already been stored in the second memory and send it to a re-encoding unit 211. The re-encoding unit 211 performs re-encoding processing for the encoded data as in the same manner as the re-encoding unit 109 in FIG. 1.

A third counter 212 counts the amount of data output from the re-encoding unit 211. The third counter 212 is reset to zero immediately before re-encoding processing is started, and counts the amount of output data during re-encoding processing. Upon completion of the re-encoding processing, the third counter 212 transfers the obtained count value to the second counter 210.

The second counter 210 calculates the total data amount of encoded data and re-encoded data stored in the second memory 207 by adding the transferred data amount count value and the count value held in the second counter 210. That is, the data amount stored in the memory 207 coincides with the count value of the counter 210.

If there is image data from the input unit 201 which is to be encoded, the encoding processing by the two encoding units 202 and 205 is continued regardless of whether the re-encoding processing is terminated or not terminated. Whether the count value of the counter 208 has reached a certain set value is repeatedly monitored until encoding processing (encoding and re-encoding) for 1-page image data input from the input unit 201 is completed. The above encoding/re-encoding processing is executed in accordance with control operation corresponding to the detection result obtained in this operation.

Figure 12:
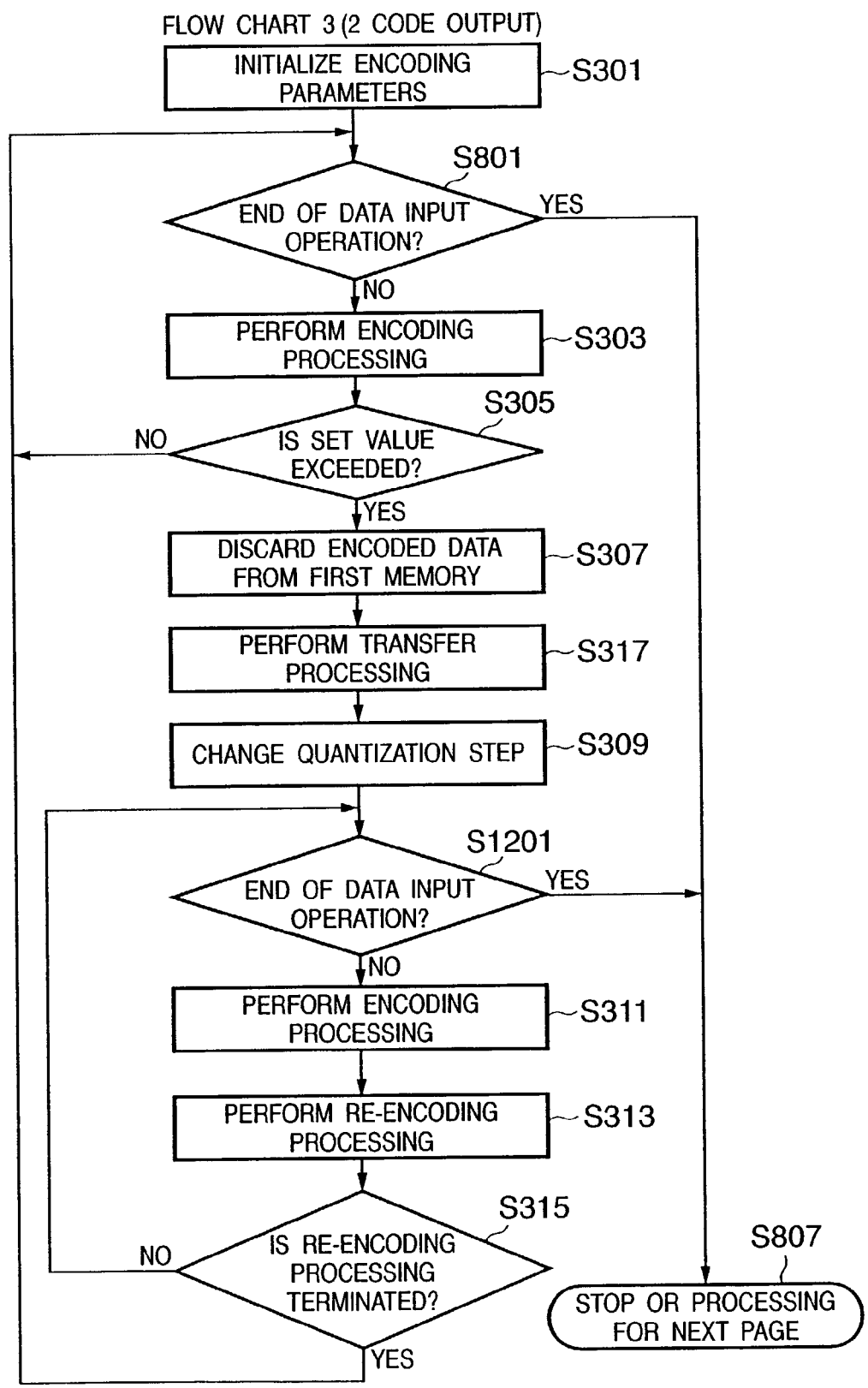
FIG. 12 is a flow chart showing a procedure in the second embodiment.

FIG. 12 is a flow chart showing the flow of processing in the arrangement shown in FIG. 2.

If there are two encoding units as described with reference to FIG. 2, 1-page image data is encoded on the basis of the flow chart of FIG. 12. Note that most of the description made with reference to FIG. 12 is similar to that made with reference to FIG. 8 which is a flow chart for the case wherein one encoding unit is used, and those skilled in the art can satisfactorily understand the characteristic feature of the second embodiment from the above description. Therefore, the processing will be described in three phases as in the case wherein one encoding unit is used, and points different from those in FIG. 8 will be mainly described below.

The largest difference between the flow in FIG. 8 and that in this embodiment is that the transfer processing in step S317 is moved between steps S307 and S309. That is, it can be regarded that the encoding/re-encoding phase and the transfer phase are interchanged (except for discarding processing of encoded data in step S307).

In initializing encoding parameters in step S301, the quantization step Q1 and quantization step (=2×Q1) are respectively set in the first encoding unit 202 and second encoding unit 205.

Figure 13:
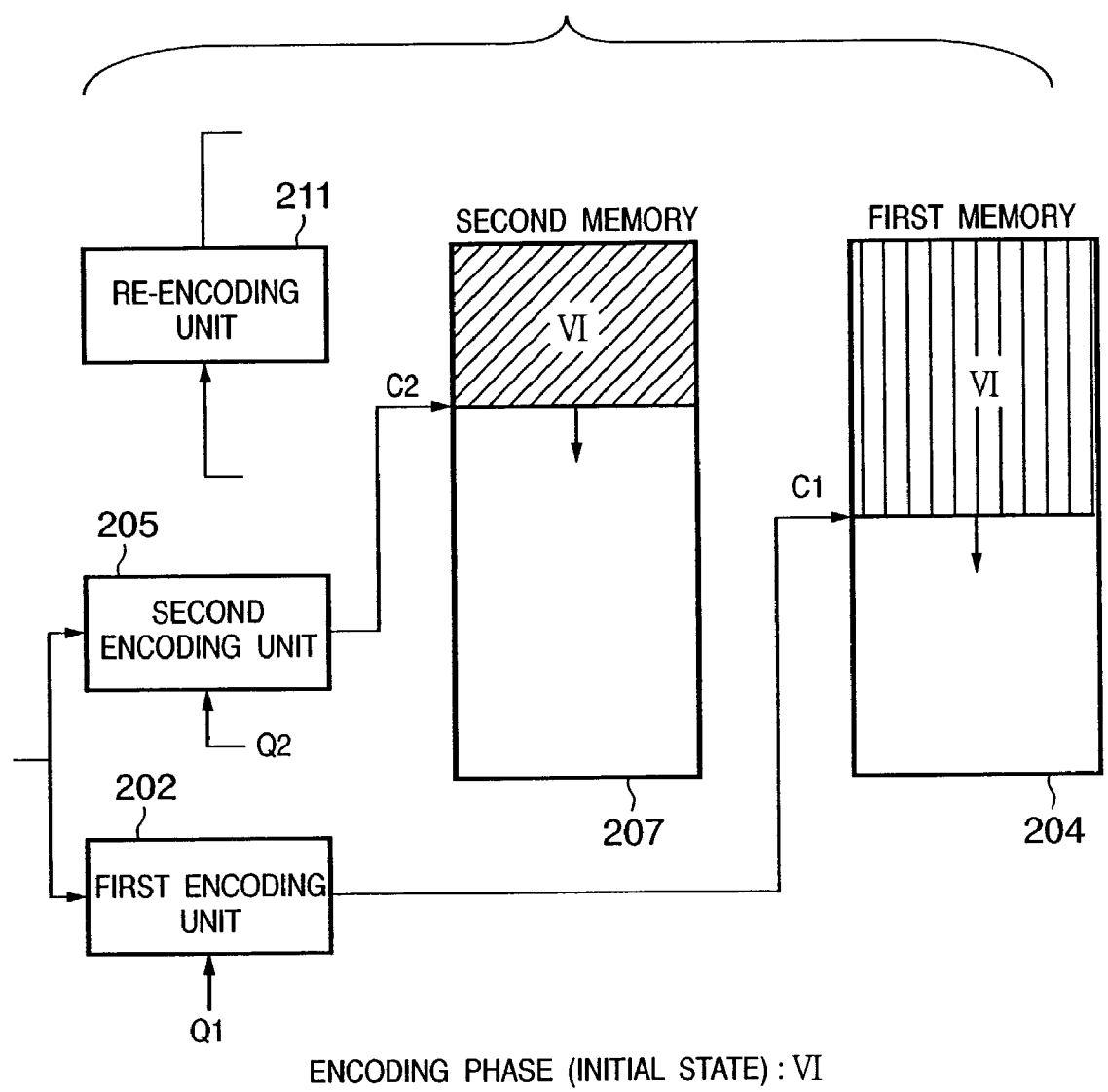
FIG. 13 is a view showing a data flow and the contents of memories in an encoding phase in the initial state in the second embodiment.

In the encoding phase, steps S801, S303, and S305 are repeatedly executed. Although the processing in steps S801 and S305 is the same as that in the case with one encoding unit, only the encoding processing in step S303 differs, as shown in FIG. 13.

In order to increase the compression ratio of encoded data to be stored stepwise, the data encoded with the quantization step Q1 corresponding to the lowest compression ratio is stored as the first encoded data in the first memory 204, and the data encoded with the quantization step Q2 is stored in the second memory.

Figure 14:
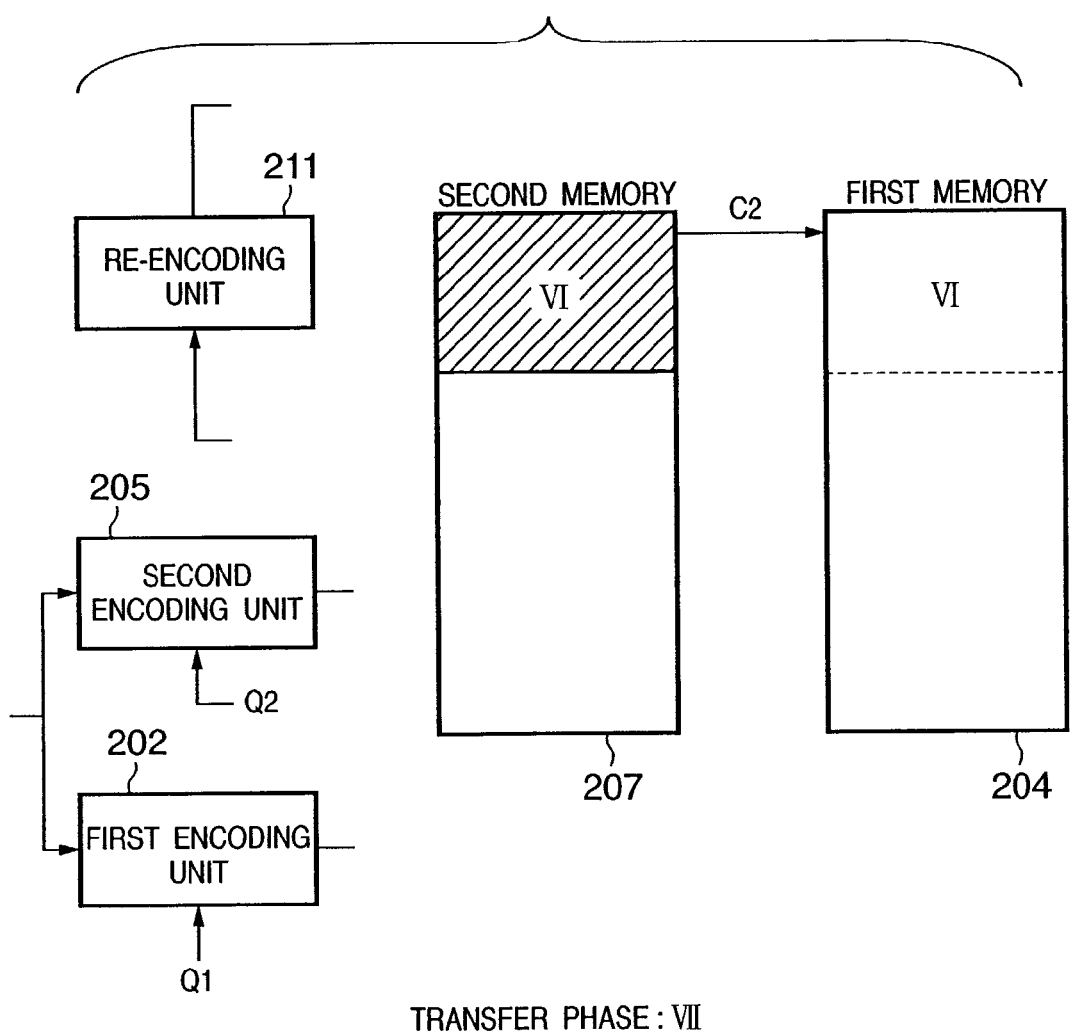
FIG. 14 is a view showing a data flow and the contents of the memories in a transfer phase in the second embodiment.

If the data amount of data stored in the first memory 204 exceeds a set upper limit (step S305), the encoded data held in the first memory 204 is immediately discarded (step S307), and the encoded data with the high compression ratio held in the second memory 207 is transferred to the first memory 204 (see step S317 in FIG. 14). This makes it possible to quickly store the second appropriate candidate encoded data, which does not exceed the upper limit, in the first memory 204 without waiting for the end of the first re-encoding processing described in the first embodiment (FIG. 1). This is the greatest merit in using the arrangement shown in FIG. 2 which has the two encoding units as compared with the arrangement shown in FIG. 1.

The second embodiment is based on the idea that it is useless to have encoded data with the same compression ratio in the two memories 204 and 207, and hence encoded data with a compression ratio higher than that of encoded data stored in the first memory 204 is stored in the second memory 207. The subsequent processing is therefore performed on the basis of this idea. Upon completion of transfer of the encoded data in the second memory 207 to the first memory 204 (transfer phase), the encoded data in the second memory 207 is re-encoded to hold encoded with a compression ratio further increased by one step.

Figure 15:
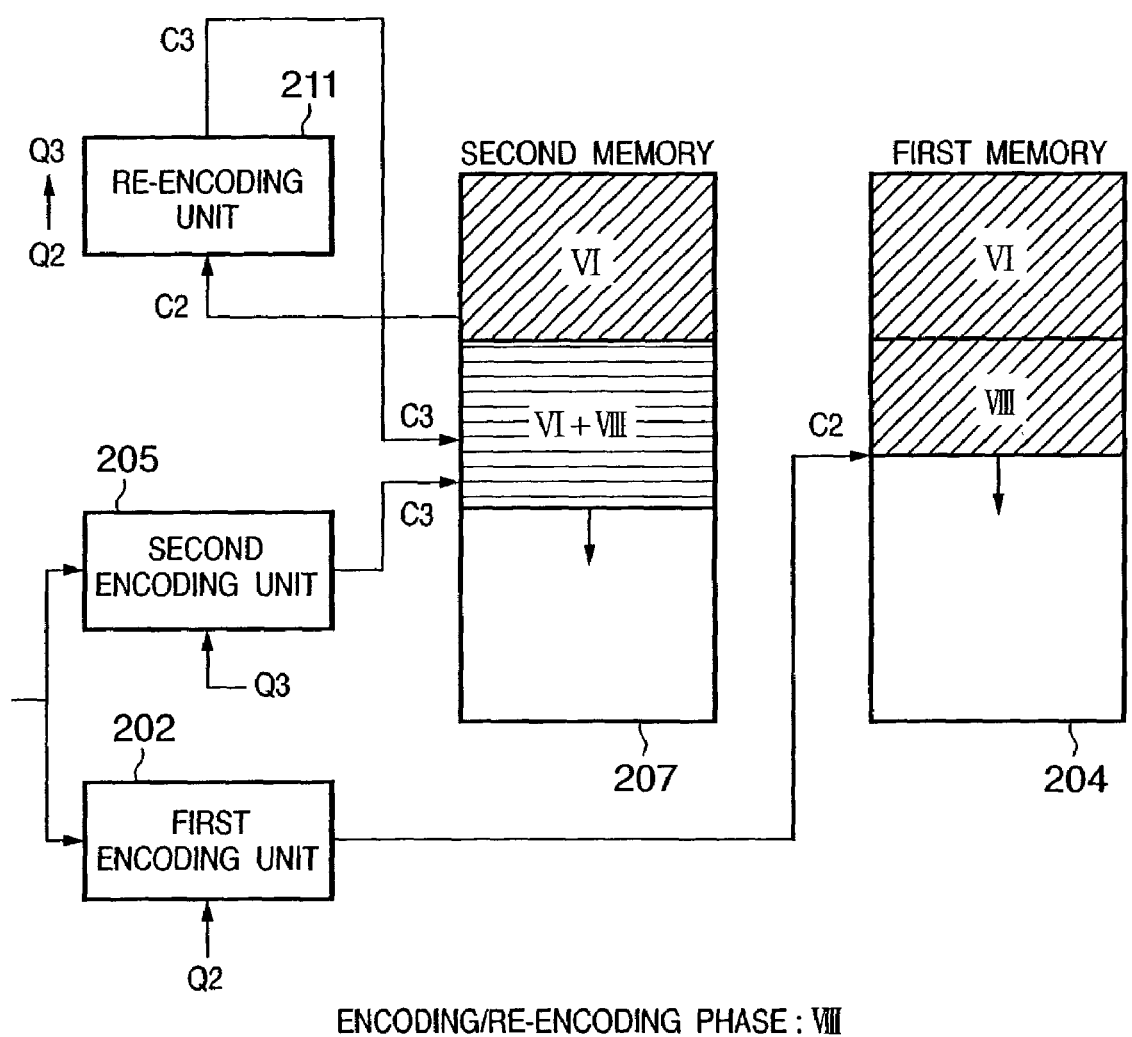
FIG. 15 is a view showing a data flow and the contents of the memories in an encoding/re-encoding phase in the second embodiment.

More specifically, as shown in FIG. 15, in the encoding/re-encoding phase after the transfer phase, the quantization steps Q1 and Q2 set in the two encoding unit 202 and 205 are changed to Q2 and Q3, respectively, prior to re-encoding (step S309). If 1-page image data is continuously input without being stopped (step S803), the subsequent image data as input data are encoded by the two encoding units in which the new quantization steps are set (step S311), and the resultant data are respectively stored in the corresponding memories 204 and 207. Concurrently with the above encoding processing, the encoded data stored in the second memory (the data transferred to the first memory 204) is re-encoded (step S313) by the re-encoding unit 211 to change the data into encoded data with a compression ratio higher than that of the encoded data in the first memory by one step so as to obtain data encoded with the quantization step Q3. The re-encoded data is then stored in the second memory 207.

In the second embodiment, as in the first embodiment, in this re-encoding processing, bit shift processing is performed for each quantized value obtained by temporarily Huffman-decoding encoded data so as to obtain the same result as that obtained by dividing each value by $2^n$. After this operation, Huffman encoding is performed again. This method allows high-speed re-encoding processing because the quantization step is changed by bit shift alone and neither inverse orthogonal transformation nor re-orthogonal transformation is performed.

Note that if there are two encoding units as in the second embodiment, encoded data and re-encoded data may be mixed and stored in the second memory 207, as shown in FIG. 15. As described above, therefore, encoded data must be divided into certain units to be managed as files or packets in the second memory 207 as well. For this purpose, the same arrangement as that in the modification of the first embodiment may be provided.

Figure 16:
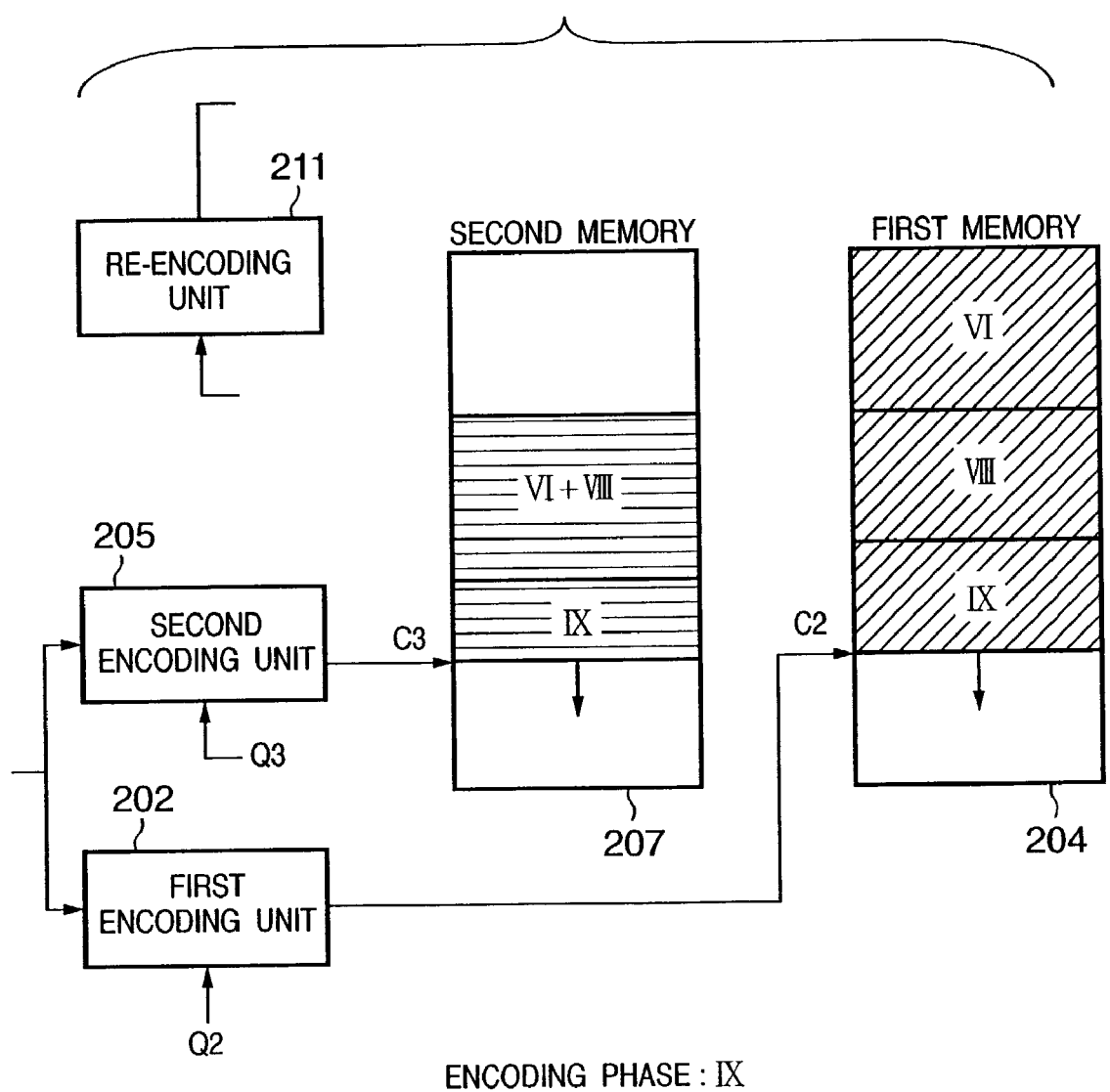
FIG. 16 is a view showing a data flow and the contents of the memories in an encoding phase after the encoding/re-encoding phase in the second embodiment.

Referring to FIG. 12, when the end of re-encoding processing is detected in step S315, the flow shifts to the encoding phase (steps S801 and S303). Note that in the encoding phase after the encoding/re-encoding phase, the encoded data held in the two memories 204 and 207 differ in their compression ratios and in their manners (addresses) in which encoded data are mixed, as shown in FIG. 16. If, therefore, the amount of data to be stored in the first memory 204 exceeds a set value, the encoded data (codes in the area indicated by horizontal stripes VI+VIII) held in the second memory 207 needs to be transferred to the first memory 204. In consideration of them, encoded data must be managed as files or packets in the first memory 204 as well as the second memory 207. The first memory 204 therefore requires a management mechanism using the above management table.

The state of the encoded phase shown in FIG. 16 is the same as the initial state of the encoded phase (FIG. 13) except that the quantization steps and the manners in which encoded data are mixed differ before and after re-encoding processing. By repeating the encoding phase, transfer phase, and encoding/re-encoding phase, therefore, the encoded data obtained by compressing 1-page image data to a set upper limit or less can be reliably stored in the first memory 204.

Since the transfer phase and encoding/re-encoding phase are performed in the reverse order to that in the first embodiment, detection of the end of inputting of 1-page image data (step S805), which is performed after transfer processing in FIG. 8, is done at almost the same timing as the detection of the end of inputting of 1-page image data, which is performed in the encoding/re-encoding phase (step S803). The two detecting operations are almost the same as step S805 in terms of function and almost the same as step S803 in terms of timing. These two steps are therefore integrated into a new step of detecting the end of inputting of 1-page image data. This step is written as step S1201.

In the first and second embodiments, the first and second memories are described as physically different memories. This makes it possible to independently access the two memories. This merit is characteristic to the present invention. However, the present invention incorporates even a case wherein the first and second memories are not physically different memories. Assume that two areas corresponding to the above first and second memories are ensured on physically one memory. In this case, it is obvious from the above description with the first and second memories being replaced with the first and second memory areas that the present invention can be realized by one memory.

If each embodiment described above is realized one memory, some of the data transfer operations described with reference to the transfer phase become unnecessary. The details of each of such cases can be easily expected, and hence a description thereof will be omitted. When the above two areas are strictly separated from each other and used, data transfer processing is required as in the case wherein physically two memories are used. If, however, identical data are shared between the two areas, no data transfer processing is required, and a reduction in storage capacity can be attained.

Assume that the encoded data held in the second memory area is to be transferred to the first memory area. In this case, the same effect as transferring the encoded data can be obtained by only transferring two pieces of information, i.e., the start address at which the encoded data is stored and its data size, from the second memory control unit to the first memory control unit.

If the encoded data is stored in a file or packet form, the amount of information to be transferred between the memory control units slightly increases; management table information associated with the encoded data must be transferred. Even in this case, higher efficiency can be obtained by the above operation than by transferring the encoded data.

As described above, according to the first and second embodiments, encoded data within a set size can be effectively generated by inputting an image once.

<Premise on which Third and Fourth Embodiments Are Based>

In the first and second embodiments described above, it does not matter whether an input image is a monochrome or color image. If, however, an input image is a color image, encoding suitable for a color image can be done. Since a color image contains a plurality of color components, an independent quantization step can be applied to each color component.

Figure 17:
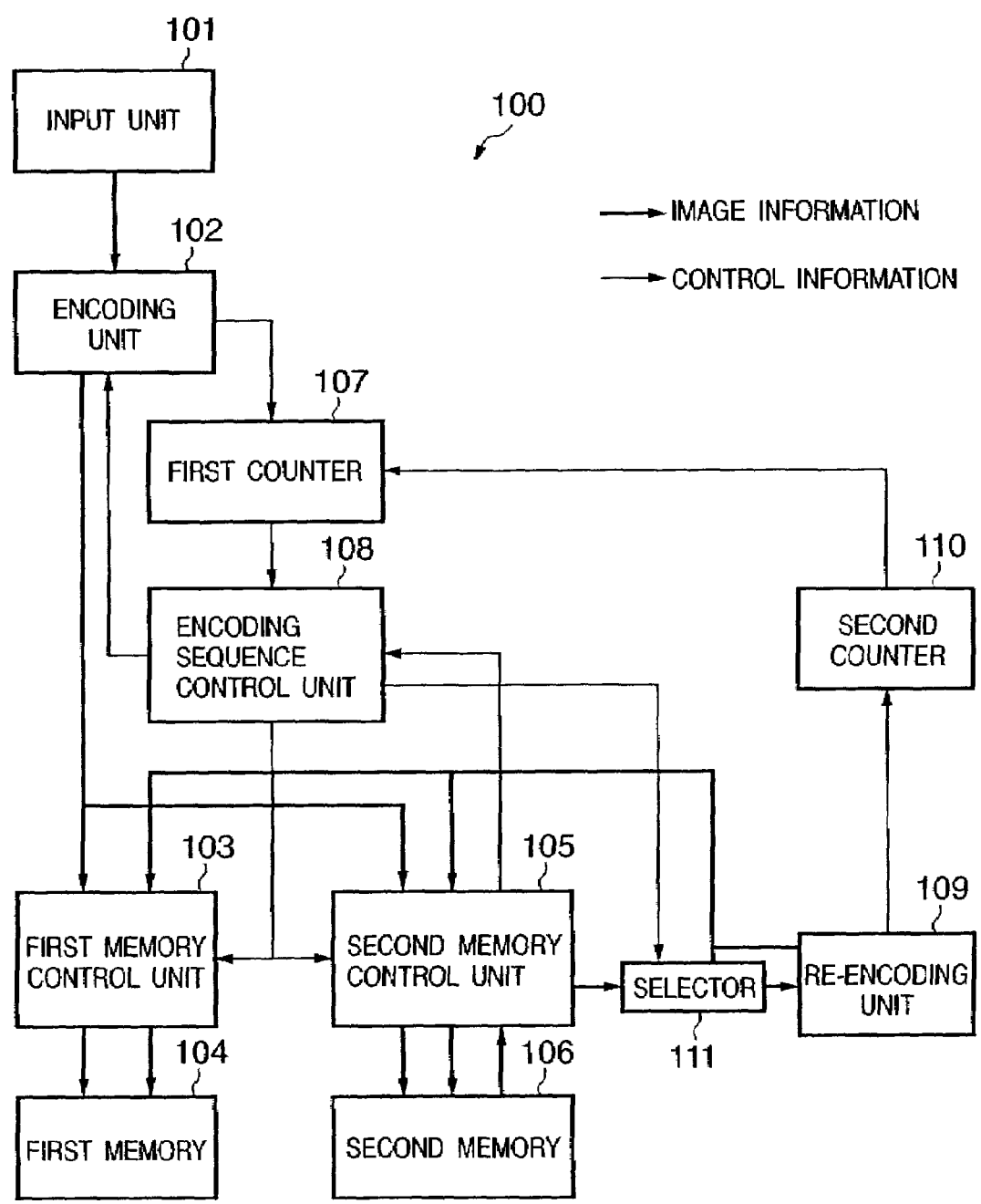
FIG. 17 is a block diagram showing the arrangement of an image processing apparatus according to the third embodiment.

FIG. 17 is a functional block diagram of an image processing apparatus 100 to which the third embodiment is applied. This arrangement is the same as that shown in FIG. 1 except that a selector 111 is added. The same reference numerals therefore denote the same parts. Note, however, that both an encoding unit 102 and a re-encoding unit 109 are designed to encode color images. Assume that each of the encoding unit 102 and re-encoding unit 109 in the third embodiment includes a conversion circuit for temporarily converting input color image data into a luminance signal and color difference signals, and compression-encodes the converted data. As luminance and color difference signals, signals defined in the Y-Cr-Cb color space or YIQ color space may be used. For the sake of convenience, therefore, in this embodiment, luminance data is represented by Y, and color difference signals are represented by C1 and C2.

The overall arrangement will be described below.

The image processing apparatus 100 includes the input unit 101 for inputting an image from an image scanner. Note that the input unit 101 may input image data by page description language rendering or read image files stored in a storage medium. In some case, the input unit 101 may receive image data from a network.

The encoding unit 102 encodes the input image data. Note that in this embodiment, a known JPEG encoding scheme is used as an encoding scheme. In addition, the image data is subjected to orthogonal transformation on an 8×8 pixel basis, and the resultant data is subjected to quantization using an quantization step (to be described later) and Huffman encoding processing.

A first memory control unit 103 and second memory control unit 105 perform control so as to store the above encoded data (identical encoded data) output from the encoding unit 102 in a first memory 104 and second memory 106, respectively. In this case, the first memory 104 is a memory for holding the finally confirmed (compressed within a target data amount) encoded data to allow it to be output to a network device, image output apparatus, large-capacity storage apparatus, and the like externally connected to the basic arrangement shown in FIG. 1. The second memory 106 is a work memory for aiding in compression encoding to form the encoded data in the first memory.

A counter 107 counts the data amount of image data compression-encoded by the encoding unit 102, and holds the count value. The counter 107 also outputs the count result to an encoding sequence control unit 108 for controlling an encoding sequence.

The encoding sequence control unit 108 detects whether the count value of the counter 107 has reached a set value. Upon detecting that the count value has reached the set value (exceeded the target value), the encoding sequence control unit 108 outputs a control signal to the first memory control unit 103 so as to discard the data stored in the first memory 104. The first memory control unit 103 discards the stored data by clearing the memory address counter or encoded data management table on the basis of this control signal. At this time, the encoding sequence control unit 108 clears the counter 107 to zero (continuously inputting data from the input unit 101), and also controls the encoding unit 102 to encode data at a higher compression ratio. That is, the encoding sequence control unit 108 performs control to finally reduce the data amount of encoded data generated by encoding processing in this apparatus to ½. Obviously, this value can be set to an arbitrary value other than ½.

The encoded data obtained after the compression ratio is changed is also stored in the first and second memories 104 and 106 through the first and second memory control units 103 and 105.

Furthermore, the encoding sequence control unit 108 causes the second memory control unit 105 to read out the encoded data stored in the second memory 106, and outputs a control signal to a re-encoding unit 109 serving as an encoded data converting means so as to output the encoded data.

The re-encoding unit 109 decodes the input encoded data and performs re-quantization to reduce the data amount. The re-encoding unit 109 then performs encoding processing (entropy encoding) again and outputs a data amount with the same compression ratio as that of the encoding unit 102, which has been changed, to a second counter 110.

The encoded data output from this re-encoding unit 109 is stored in the first and second memories 104 and 106 through the first and second memory control units 103 and 105.

The second memory control unit 105 detects whether re-encoding processing is terminated. More specifically, when there is no data to be read out for re-encoding processing, the second memory control unit 105 notifies the encoding sequence control unit 108 of the end of the re-encoding processing. In practice, the encoding processing is completed when the processing by the re-encoding unit 109 is terminated as well as the read processing by the second memory control unit 105.

The count value obtained by the second counter 110 is added to the counter value held in the counter 107 upon completion of the re-encoding processing. This addition result indicates the sum of data amounts in the first memory 104 immediately after the completion of the re-encoding processing. That is, when the encoding processing for one frame is completed by the encoding unit 102 and re-encoding unit 109, the counter value held in the first counter 107 after the above addition indicates the total amount of data generated when this apparatus encoded 1-frame data (to be described in detail later).

The encoding unit 102 continuously performs encoding processing as long as image data from the input unit 101, which should be encoded, is left, regardless of whether re-encoding processing is terminated or not terminated.

Whether the count value of the first counter 107 has reached a given set value is repeatedly checked until encoding processing (encoding and re-encoding) of 1-page image data input from the input unit 101 is terminated. The above encoding/re-encoding processing is executed in accordance with control operation corresponding to the detection result obtained in this operation.

The switching signal output from the encoding sequence control unit 108 is supplied to the selector 111. The selector 111 then switches between sending data to be encoded to the re-encoding unit 109 and returning it to the memory control units 103 and 105 without any change.

As in the first embodiment described above, the processing contents in this arrangement have (1) an encoding phase,
(2) an encoding/re-encoding phase, and
(3) a transfer phase.

Procedures for storage of data into the first and second memories are the same as those shown in FIGS. 4 to 7.

The third embodiment differs from the first and second embodiments in that an image to be compression-encoded is a color image. The third embodiment relates to a method of coping with a case wherein a code amount exceeding a set value is counted by the first counter 107.

Although described in detail later, as shown in FIG. 20, when encoded data is generated in an amount exceeding a set value for the first time since compression encoding of an input image is started, the encoding unit 102 continues encoding data while increasing the quantization step higher than the quantization step in the initial state with respect to the alternating current components (AC) of color difference data C1 and C2. Since the color image data encoded with the quantization step in the initial state has already been stored in the second memory, the alternating current components of the color difference signals C1 and C2 are selected by the selector 111 and re-encoded by the re-encoding unit 109. The resultant data are then stored in the first and second memories.

If it is determined that the code amount exceeds the set value next, the quantization step for an alternating current component AC of a luminance data Y is increased in accordance with the table shown in FIG. 20.

As described above, the third embodiment can finely adjust the code amount of data generated by selecting a luminance data or color difference data for which the quantization step is to be changed and also selecting an alternating current or direct current component upon DCT processing, instead of simply increasing the quantization step for all color components.

Figure 18:
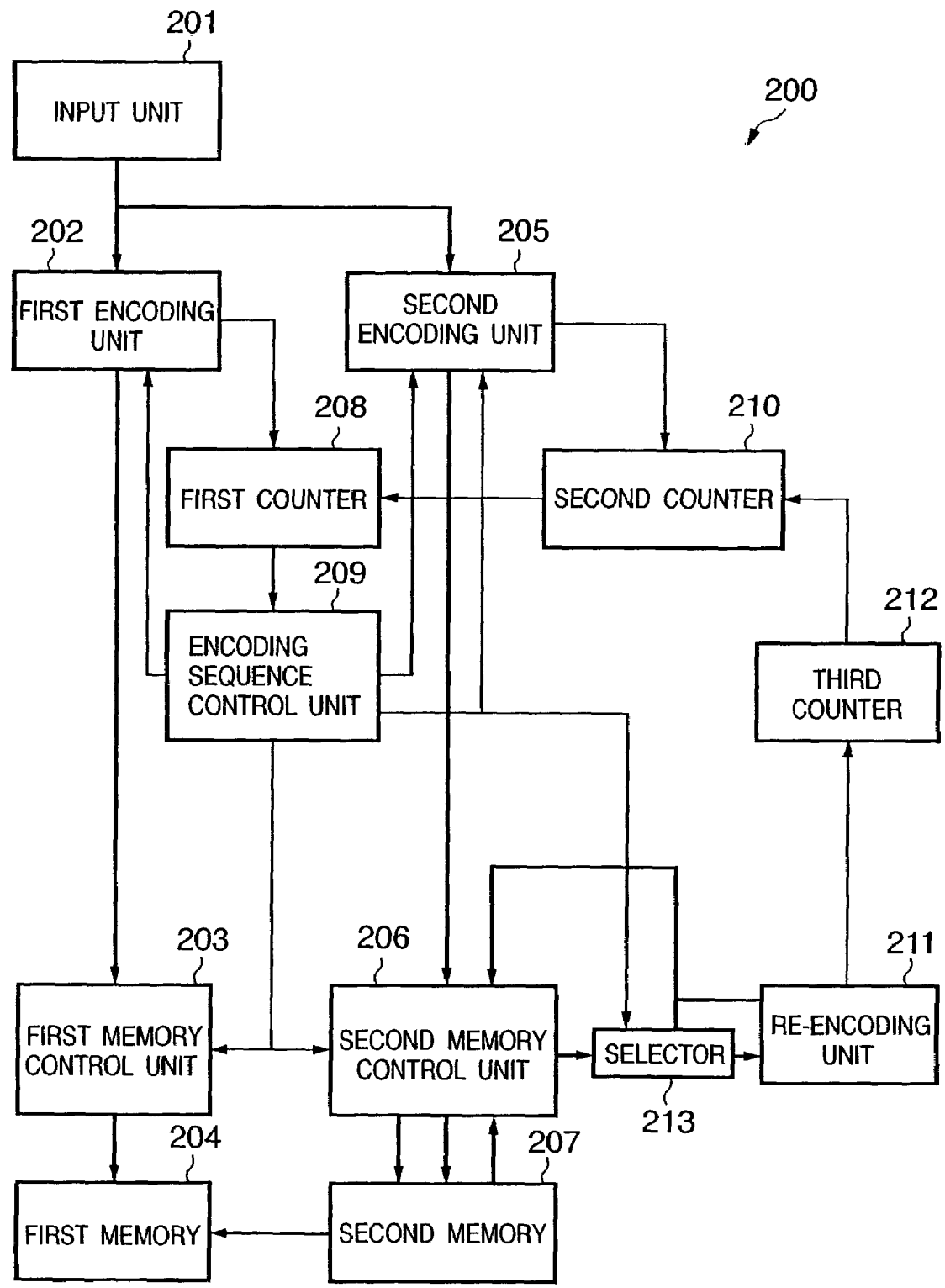
FIG. 18 is a block diagram showing the arrangement of an image processing apparatus according to the fourth embodiment.

The above description is about an outline of the third embodiment (FIG. 17) corresponding to the first embodiment (FIG. 1). The fourth embodiment corresponding to the second embodiment (FIG. 2) has an arrangement like that shown in FIG. 18. The arrangement in FIG. 18 differs from that in FIG. 2 in that the selector 111 is added. Therefore, the remaining components are denoted by the same reference numerals. With regard to processing contents in a case wherein the code amount of data generated exceeds a set value, the manner in which data are stored in the first and second memories is the same as that in the second embodiment. The difference from the second embodiment is that a target component for which the quantization step is increased is determined in accordance with the scenario shown in FIG. 20.

An application example of the third embodiment will be described in detail below in accordance with the above outline. Note that the fourth embodiment (FIG. 18) is the same as the second embodiment except that color images are processed, and components for which the quantization step is changed when the code amount exceeds a set value are the same as those in the third embodiment to be described below. Therefore, a description of the fourth embodiment will be omitted.

Third Embodiment

Figure 19:
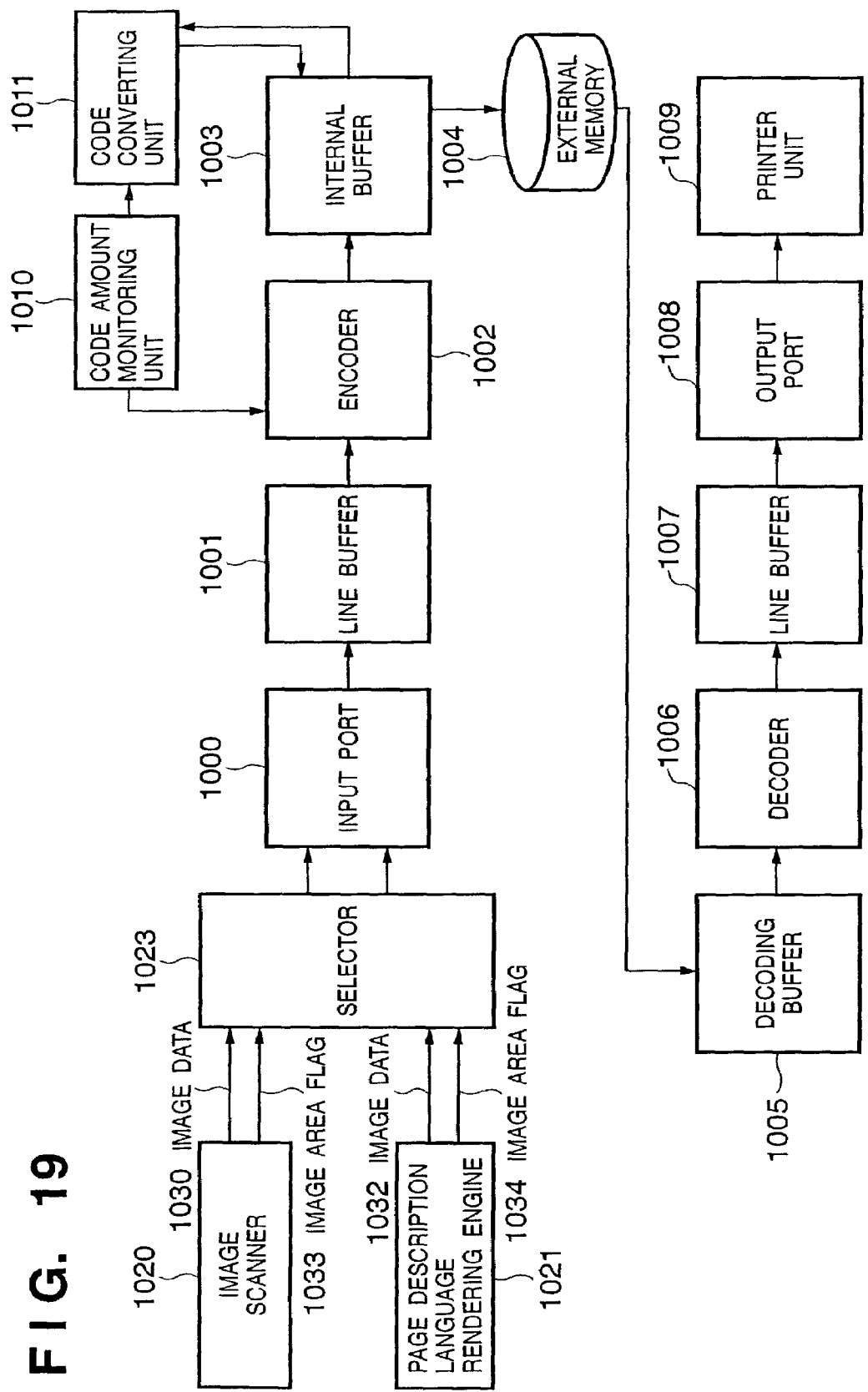
FIG. 19 is a block diagram showing the detailed arrangement of an image processing apparatus to which the third embodiment is applied.

FIG. 19 is a block diagram showing the arrangement of a digital image processing apparatus to which the third embodiment is applied.

Referring to FIG. 19, reference numeral 1000 denotes an input port for color image data (including image area information and color image data). As shown in FIG. 19, a selector 1023 is connected to the input port 1000. The selector 1023 selects an image scanner 1020 or a rendering engine 1021 based on the print data output from a host computer (selects through an operation panel (not shown) or automatically selects in accordance with input operation). Assume that color image data 1031 and 1032 and pieces of image area information 1033 and 1034 (information for identifying whether each pixel exists in a character/line image area or halftone area and is a color or monochrome pixel) are output from both the scanner and the rendering engine. The rendering engine 1021 can generate image area information on the basis of print data (a halftone image is transferred as image data from the host computer, and a character/line image is drawn in accordance with a draw command). The image scanner 1020 basically reads an original image and needs to determine on the basis of the read image whether the image exists in a character/line image area or halftone area and is a color or monochrome image. Assume therefore that the image scanner 1020 incorporates a circuit for generating such image area information.

Reference numeral 1001 denotes a line buffer having a plurality of lines of an input image (capacity large enough to extract tiles); and 1002, a color image encoder corresponding to the encoding unit 102 in FIG. 1. The color image encoder 1002 in this embodiment, however, includes a conversion circuit for temporarily converting input color image data into a luminance signal and color difference signals, and compression-encodes the converted data. As luminance and color difference signals, signals defined in the Y-Cr-Cb color space or YIQ color space may be used. For the sake of convenience, therefore, in this embodiment, luminance data is represented by Y, and color difference data is represented by C1 and C2.

Reference numeral 1003 denotes an internal buffer for storing encoded data temporarily.

Reference numeral 1004 denotes an external memory (e.g., a hard disk) for storing encoded color image data; 1005, a decoding buffer for temporarily storing read encoded image data to decode it; 1006, a decoder; 1007, a line buffer for storing a decoded image temporarily; and 1008, an output port for outputting the image stored in the output port 1008 to a printer unit 1009 connected to the port. Assume that the printer unit 1009 incorporates a conversion circuit for converting the data Y, C1, and C2 into print color components Y, M, and C (or Y, M, C, and Bk). In addition, the printer unit 1009 is not limited to any specific printing scheme. For example, a laser beam printer or a printer designed to discharge ink droplets may be used.

Reference numeral 1010 denotes a code amount monitoring unit for monitoring the code amount of data stored in an internal buffer 1003; and 1011, a code converting unit for performing re-encoding.

In relation to FIG. 17, the internal buffer 1003 serves as both the first and second memories in FIG. 1. In addition, the encoding sequence control unit 108, first counter 107, second counter 110, and selector 111 correspond to the code amount monitoring unit 1010, and the re-encoding unit 109 corresponds to the code converting unit 1011.

The color image encoder 1002 divides the image data stored in the line buffer 1001 into tiles each having a size of 8×8 pixels (each tile is not limited to 8×8 pixels and may have M×M pixels), and encodes color information on an 8×8 pixel basis. A color image is encoded by discrete cosine transform (JPEG), whereas image area information is encoded by run-length encoding.

Image are a information is attached to each pixel. When, however, data is to be processed by DCT for each 8×8 pixel block, an image area flag is representatively attached to each block. Image areas are classified according to the character and photographic areas of an image and whether a given area is color or monochrome. However, another method may be used or other components may be added.

The code amount monitoring unit 1010 monitors the code amount of data generated by the color image encoder 1002. When expecting that the code amount will exceed a set amount, the code amount monitoring unit 1010 causes the encoder 1002 to encode subsequent input color image (and attribute information) with higher encoding efficiency, and also causes the code converting unit 1011 to re-encode the previously encoded data with higher encoding efficiency.

In the third embodiment, in order to gradually increase the encoding efficiency every time a code amount exceeds the set value, the following operation is performed.

As described above, the third embodiment is configured to encode a color image. Color image data is expressed in a color space form defined by the luminance data Y and color difference data C1 and C2.

When determining the code amount of data generated by the encoding unit 102 has exceeded a target value after the start of encoding of a given page, the code amount monitoring unit 1010 (the encoding sequence control unit 108 in FIG. 17) causes the encoding unit 102 to encode the alternating current component (AC) obtained by orthogonal transformation of the color difference data C1 and C2 while setting a quantization step higher than before. With this operation, color images input after it is determined that the code amount has exceeded the target value are encoded with a higher compression ratio.

In addition, since the data encoded until it is determined that the code amount has exceeded the target value is stored in the second memory, the re-encoding unit 109 is caused to output only the encoded color difference data C1 and C2 to the second memory control unit 105, and a control command is issued to the selector 111 to output the data to the re-encoding unit 109. In addition, the encoding sequence control unit 108 causes the re-encoding unit 109 to decode the encoded color difference data C1 and C2 and encode their alternating current components (AC components) upon increasing their quantization step. The re-encoded color difference data are stored in the first memory 104 and second memory 106. With this operation, even the data encoded before the code amount has exceeded the target value can be encoded with a high compression ratio.

In brief, when the code amount exceeds the target value for the first time in inputting and encoding the color image data of a given page, the alternating current components of the color difference data C1 and C2 are continuously encoded with a higher quantization step.

If the code amount exceeds the target value again during the above processing, the alternating current component of the luminance data Y is determined as a target for which the quantization step is to be changed.

In this manner, every time the code amount exceeds the target value, the quantization steps for the alternating current components and direct current components of the luminance data Y and color difference data C1 and C2 are changed (set higher) to gradually increase the compression ratio.

For this purpose, the encoding sequence control unit 108 has a scenario table like the one shown in FIG. 20, and performs control to gradually increase the compression ratio in the order of the first scenario, second scenario, third scenario, . . . as the number of times the code amount exceeds the target value for a given page is counted.

When, therefore, the code amount exceeds the target value for the first time while a given page is encoded, the alternating current components AC of the color difference data C1 and C2 become targets to be selected in accordance with the table shown in FIG. 20, and hence the above processing is performed.

Figure 21:
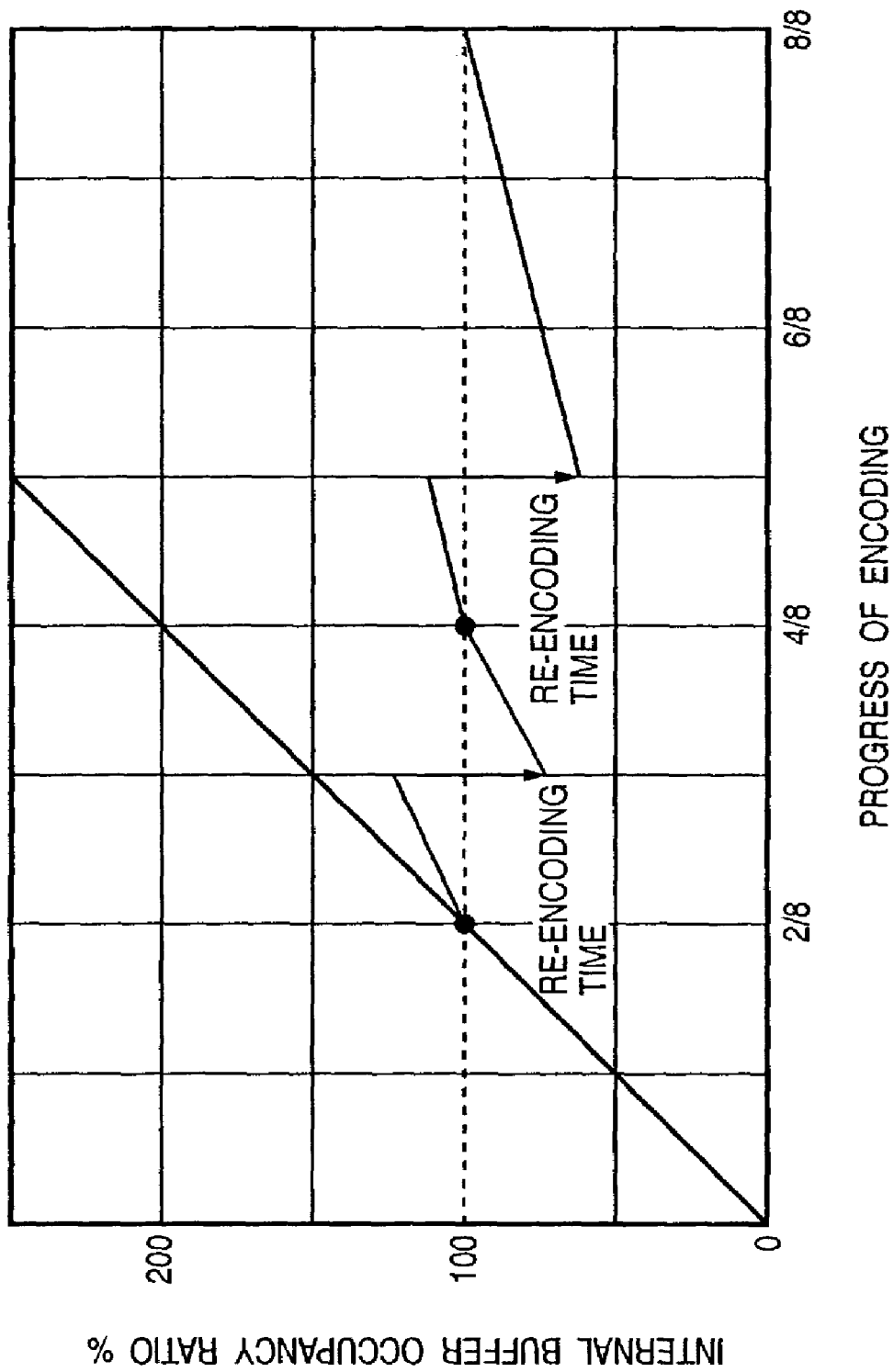
FIG. 21 is a graph showing the transition of a code amount in the third embodiment.

FIG. 21 is a graph for explaining the relationship between the progress of encoding and the memory occupancy ratio. An operation sequence will be briefly described below with reference to FIG. 21.

Referring to FIG. 21, coded data has overflowed at the time point of 2/8 under the condition of initial values (with encoding parameters in the initial stage). According to this embodiment, after this time point, the quantization step for the alternating current components of the color difference data C1 and C2 is increased, and color image data is continuously encoded. With regard to the data that has already been encoded, the color difference data of the data are decoded, and the quantization step for the alternating current components is increased, thus starting re-encoding processing.

At the time point of 3/8, re-encoding processing before it is determined that the code amount has exceeded the target value is completed, and transfer processing to the first memory 104 is completed.

At the time point of 4/8, coded data overflows again, and hence re-encoding processing is started. Since this overflow is the second overflow, the alternating current component of the luminance data is selected and processed according to the table shown in FIG. 20. At the time point of 5/8, this en-coding processing is terminated, and transfer processing is completed.

At the time point of 8/8, 1-page image data is completely encoded.

In the above case, at the time point of 3/8, the encoded data has overrun about 25%. This value is determined by a compression ratio and re-encoding time. In an actual apparatus, such a value needs to be ensured as a design parameter, i.e., a margin of the buffer memory. However, this value does not become very large. As is obvious from FIG. 21, the processing time ends within the time required to encode a 1-page image.

As is also obvious from the above description, in the third embodiment, since quantization steps for the direct current components and alternating current components of color difference data and luminance data can be independently set, the values of the quantization steps for the alternating current components and direct current components of luminance and color difference data are stored in the first memory 104.

Figure 22A:
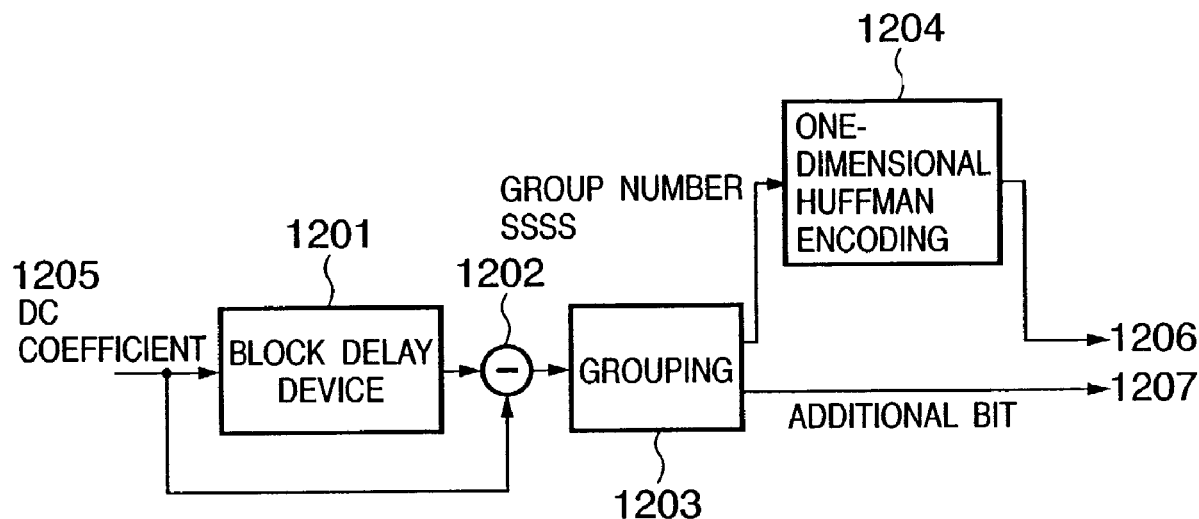
Figure 22B:
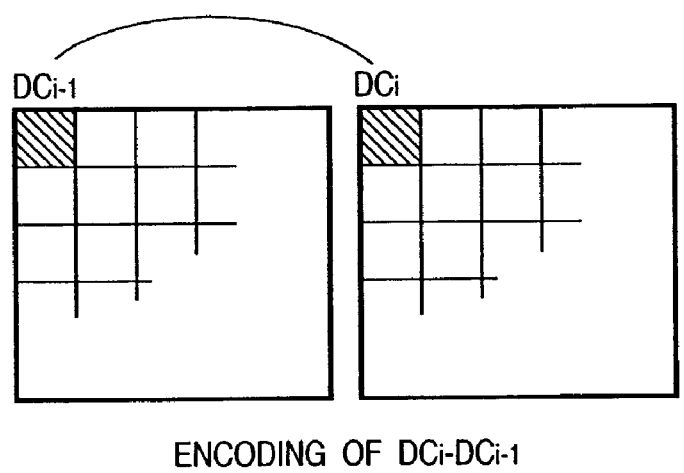

FIGS. 22A to 22D are views for explaining the direct current coefficients (DC coefficients) of DCT coefficients. FIG. 22B is a view for explaining DC coefficient encoding. The differences between a DC coefficient value (the small square at the upper left in FIG. 22B) having undergone 8×8

DCT transformation and the DC coefficient values of the adjacent blocks are obtained and variable-length encoded.

FIG. 22A is a block diagram showing an arrangement for encoding. A difference calculator 1202 calculates the difference between a DC coefficient 1205 and the DC coefficient of an immediately preceding block which is delayed by a block delay device 1201. The differential value is converted into a group number SSSS by grouping processing.

A grouping unit determines the number of additional bits in accordance with a DC differential value, as shown in FIG. 22C. The group number SSSS is Huffman-encoded by a one-dimensional Huffman encoder 1204 according to the table shown in FIG. 22D.

As is obvious from these tables, as the group number decreases, the Huffman code and the number of additional bits decrease (they are equal to each other in some cases).

When, therefore, the DC differential value decreases to ½, the group number decreases by one, and the variable-length code portion obtained by combining a Huffman code and additional bits decreases by 1 to 2 bits.

Figure 24:
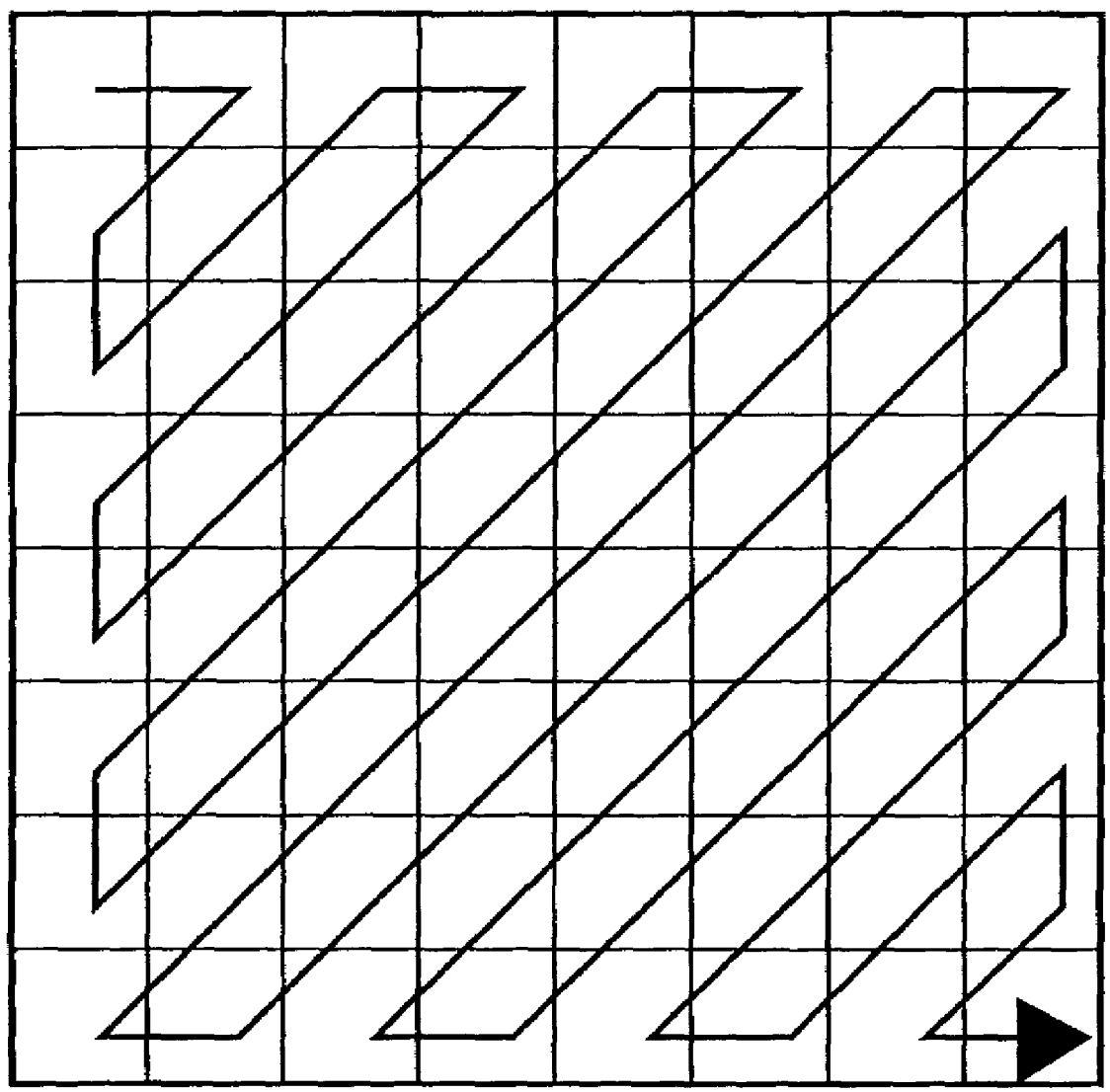
FIG. 24 is a view showing a zigzag scan for DCT coefficients.

FIG. 24 is a view for explaining a scheme of encoding the alternating current coefficients (AC coefficients) of DCT coefficients.

Figure 23:
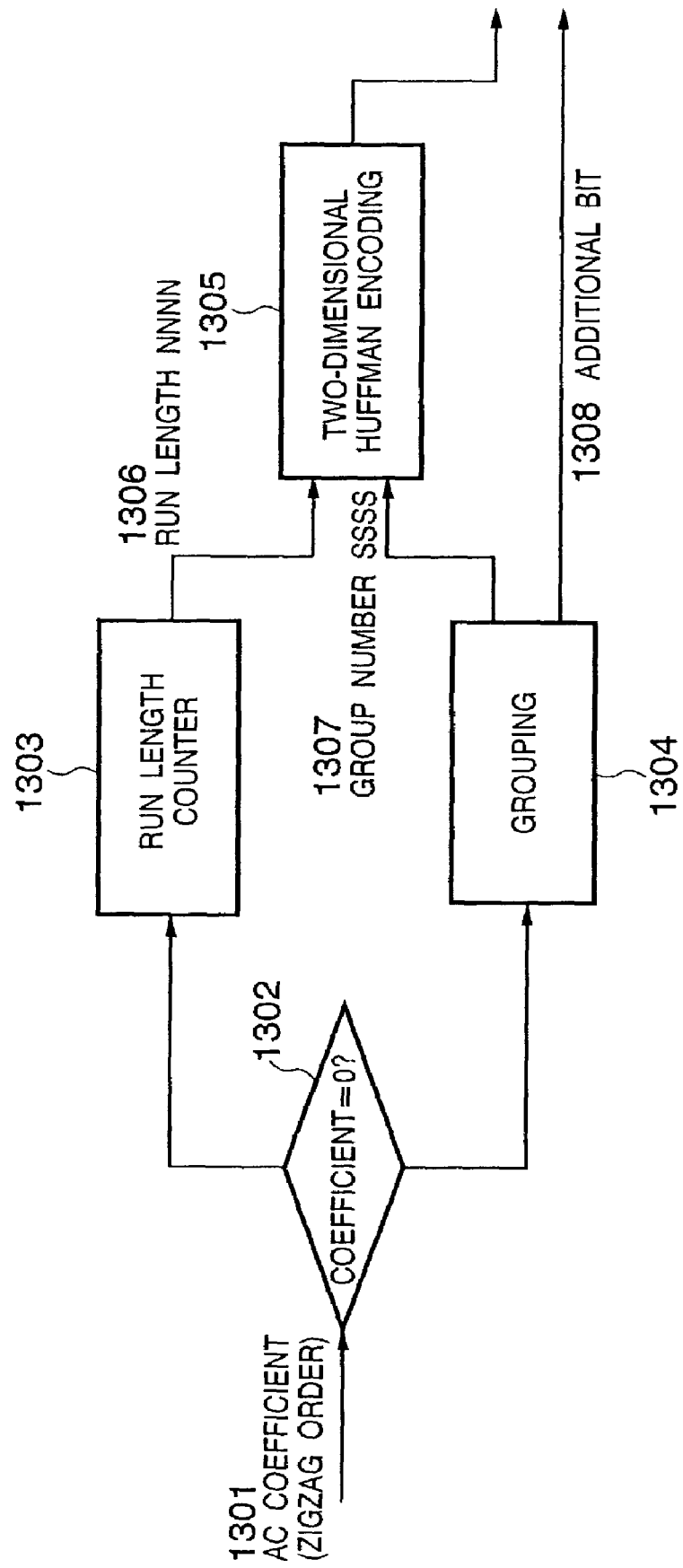
FIG. 23 is a view showing a procedure for processing alternating current components in the third embodiment.

AC coefficients 1301 are rearranged in a zigzag order. When a determining device 1302 determines 0, a run length counter 1303 counts the number of consecutive coefficients of 0 (run length), and outputs the a run length NNNN 1306. With regard to a coefficient value other than 0, a grouping device 1304 outputs a group number 1307 and additional bit 1302 as in the case shown in FIG. 22A. A two-dimensional Huffman encoder 1305 performs Huffman encoding by combining the run length NNNN and group number SSSS (see FIG. 23).

If the run length NNNN exceeds 15, ZRLs each indicating a run length of 16 are output by a necessary number. For example, a run length of 35 is converted into ZRL+ZRL+run length of 3 to be encoded.

In addition, EOB (End of Block) is added after the last effective coefficient (a coefficient other than 0).

In this embodiment, 8×8 blocks are subjected to DCT processing, zigzag scanning is performed in the order shown in FIG. 24.

FIG. 26 shows part of a Huffman code table to be looked up with a run length and size.

Obviously, as an AC coefficient value decreases to ½, the group number decreases by one, and the variable-length code portion obtained by combining a Huffman code and additional bits decreases by 1 or 2 bits.

In addition, since the coefficient value becomes zero and the run length increases, the number of dominant symbols to be encoded also decreases. As a consequence, the code length further decreases.

A case wherein an index is set in a color signal selection table in accordance with the start point of re-encoding will be described next.

Figure 27:
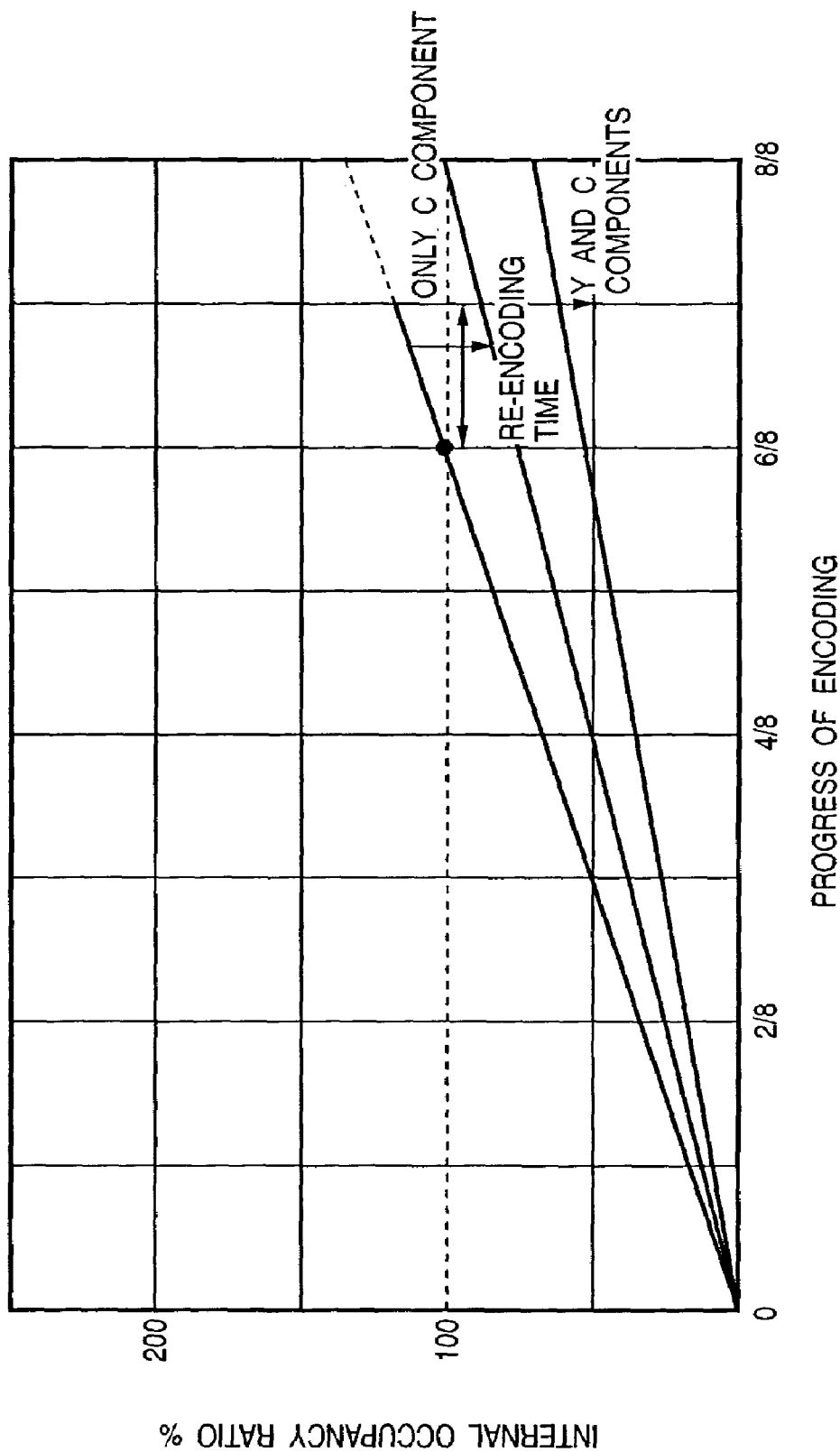
FIG. 27 is a graph showing the relationship between the progress of encoding and the memory occupancy ratio in the second embodiment.

FIG. 27 is a graph for explaining the relationship between the progress of encoding and the memory occupancy ratio.

Referring to FIG. 27, at the time point of 6/8, an encoding overflow occurs in the quantization step for an initial value, and re-encoding processing is started. In addition, encoding is continuously performed by changing the quantization step. In this case, the overflow occurs at the time point of 6/8 near the end of processing. If, therefore, all the color components are re-encoded, the code amount is reduced to about ½. That is, it is expected that the code amount may be excessively compressed below a predetermined code amount. In this case, therefore, only the AC components of color difference data in a color selection table are re-encoded, and the encoding sequence control unit performs index control on the basis of the count of the processing amount of a 1-page image. This makes it possible to prevent overcompression afterward.

<Application Example>

The above embodiment has exemplified the apparatus designed to read an image through the image scanner, and the functional operation of the apparatus has been described. Most of the functions of this apparatus (including encoding processing) can be implemented by computer programs, as described above.

The present invention can therefore be applied to an application program running on a general-purpose information processing apparatus such as a personal computer. When the present invention is to be applied to an application program, a GUI may be provided to allow the user to, for example, designate an image file as an compression source and select a target size. This target value can be arbitrarily set by the user. However, it is cumbersome for the user to set a target value by inputting a numerical value. It is therefore preferable to allow the user to determine a target value by selecting it from an intuitively perceivable menu with original sizes and image quality (e.g., high, medium, and low) being taken into consideration.

Although a quantization step has been exemplified as an encoding parameter in the encoding unit, other parameters can be used as long as they are used to prevent the development of a sense of incongruity in terms of image quality between data with different compression ratios when they are mixed. For example, in the arrangement shown in FIG. 1, in order to make re-encoded data from the re-encoding unit 109 substantially identical to encoded data from the encoding unit 102 after a parameter is changed, the technique of increasing the quantization step is preferably used as in the above embodiments.

As described above, according to the third and fourth embodiments, a multilevel color image can be encoded within a target size without performing reinput operation, and a deterioration in the image quality of the color image can be minimized.

The above embodiments have exemplified the case wherein a color image is compression-encoded as luminance and color difference data. However, a color space for expressing color components is not limited to luminance and color differences. For example, the L*a*b* color space may be used.

Although the compression parameter is changed every time a memory overflow occurs, it is preferable that the quantization step be increased with priority being given to a color component that is difficult to discriminate by the human vision. For this reason, it is preferable to use a color space suitable for a color appearance model, e.g., luminance and color differences (hue and saturation) rather than the RGB color space.

As described above, the present invention can also be implemented by an application program running on a general-purpose information processing apparatus. The present invention therefore incorporates the computer program. In addition, in general, the computer program is copied or installed in the apparatus through a storage medium such as a floppy disk or CD-ROM set in the apparatus, and executed. As is obvious, therefore, such a storage medium is also incorporated in the present invention.

In the above embodiments, image data is input from the scanner. However, the present invention can also be applied to a printer driver operating on a computer. Assume that the present invention is to be applied to the printer driver. In this case, when data to be printed is received from upper processing (an application or the like), the data can be discriminated as a halftone image or character/line image, the arrangement for image area information generation can be omitted or simplified.

Furthermore, the present invention can be applied to a combination of a computer program and appropriate hardware (an encoding circuit and the like).

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for inputting image data and encoding the data, comprising:
    first encoding means for encoding the image data in accordance with a first parameter for determining a compression ratio;
    second encoding means for encoding the image data in accordance with a second parameter for determining a compression ratio, wherein the first and second parameters are different from each other, and the compression ratio of said second encoding means is higher than the compression ratio of said first encoding means;
    third encoding means for decoding encoded data generated by said second encoding means, and for re-encoding the decoded data in accordance with a third parameter for determining a compression ratio;
    monitoring means for monitoring an encoded data amount generated by said first encoding means while image data of an input page is encoded by said first and second encoding means, and detecting whether the encoded data amount has reached a target amount;
    updating means for, when said monitoring means determines that the encoded data amount has reached the target amount, updating the first parameter set in said first encoding means with the second parameter set in said second encoding means, updating the second parameter set in said second encoding means to further increase the compression ratio of said second encoding means, and setting a parameter, which corresponds to the updated second parameter, as the third parameter set in said third encoding means; and
    control means for, when the parameters are updated or set by said updating means, storing the encoded data generated by said second encoding means before updating the second parameter, as encoded data generated by said first encoding means after updating the first parameter, causing said third encoding means to re-encode, in accordance with the third parameter, the encoded data generated by said second encoding means before the second parameter is updated, storing the re-encoded data generated by said third encoding means as encoded data generated by said second encoding means after the second parameter is updated, and storing the encoded data generated by said first encoding means after the first parameter is updated as succeeding encoded data.

2. The apparatus according to claim 1, wherein, when said third encoding means executes re-encoding, said third encoding means and said first and second encoding means operate concurrently in at least part of an interval.

3. The image processing apparatus according to claim 1, wherein the target amount is determined in accordance with an image size of the input page.

4. A control method for an image processing apparatus for inputting image data and encoding the data, comprising:
    a first encoding step, of encoding the image data in accordance with a first parameter for determining a compression ratio;
    a second encoding step, of encoding the image data in accordance with a second parameter for determining a compression ratio, wherein the first and second parameters are different from each other, and the compression ratio in said second encoding step is higher than the compression ratio in said first encoding step;
    a third encoding step, of decoding encoded data generated in said second encoding step, and re-encoding the decoded data in accordance with a third parameter for determining a compression ratio;
    a monitoring step, of monitoring an encoded data amount generated in said first encoding step while image data of an input page is encoded in said first and second encoding steps, and detecting whether the encoded data amount has reached a target amount;
    an updating step, of, when it is determined in said monitoring step that the encoded data amount has reached the target amount, updating the first parameter set in said first encoding step with the second parameter set in said second encoding step, and updating the second parameter set in said second encoding step to further increase the compression ratio in said second encoding step, and setting a parameter, which corresponds to the updated second parameter, as the third parameter set in said third encoding step; and
    a control step, of, when the parameters are updated or set in said updating step, storing the encoded data generated in said second encoding step before updating the second parameter, as encoded data generated in said first encoding step after updating the first parameter, re-encoding, in said third encoding step, and in accordance with the third parameter, the encoded data generated in said second encoding step before the second parameter is updated, storing the re-encoded data generated in said third encoding step as encoded data generated in said second encoding step after the second parameter is updated, and storing the encoded data generated in said first encoding step after the first parameter is updated as succeeding encoded data.

5. The method according to claim 4, wherein, when said third encoding step executes re-encoding, said third encoding step and said first and second encoding steps operate concurrently in at least part of an interval.

6. A storage medium storing a computer program functioning as an image processing apparatus for inputting image data and encoding the data, the program comprising:
    program code for a first encoding step, of encoding the image data in accordance with a first parameter for determining a compression ratio;
    program code for a second encoding step, of encoding the image data in accordance with a second parameter for determining a compression ratio, wherein the first and second parameters are different from each other, and the compression ratio of the second encoding step is higher than the compression ratio of the first encoding step;
    program code for a third encoding step, of decoding encoded data generated in said second encoding step, and of re-encoding the decoded data in accordance with a third parameter for determining a compression ratio;

program code for a monitoring step, of monitoring an encoded data amount generated in the first encoding step while image data of an input page is encoded in the first and second encoding steps, and detecting whether the encoded data amount has reached a target amount;

program code for an updating step, of, when the monitoring step determines that the encoded data amount has reached the target amount, updating the first parameter set in the first encoding step with the second parameter set in the second encoding step, updating the second parameter set in the second encoding step to further increase the compression ratio of the second encoding step, and setting a parameter, which corresponds to the updated second parameter, as the third parameter set in said third encoding step; and program code for a control step, of, when the parameters are undated or set in the updating step, storing the encoded data generated in the second encoding step before updating the second parameter, as encoded data generated in the first encoding step after updating the first parameter, causing the third encoding step to re-encode, in accordance with the third parameter, the encoded data generated in the second encoding step before the second parameter is updated, storing the re-encoded data generated in the third encoding step as encoded data generated in the second encoding step after the second parameter is updated, and storing the encoded data generated in the first encoding step after the first parameter is updated as succeeding encoded data.

7. An image processing apparatus for inputting image data and encoding the data, comprising:

a first encoding unit, adapted to encode the image data in accordance with a first parameter for determining a compression ratio;

a second encoding unit, adapted to encode the image data in accordance with a second parameter for determining a compression ratio, wherein the first and second parameters are different from each other, and the compression ratio of said second encoding unit is higher than the compression ratio of said first encoding unit;

a third encoding unit, adapted to decode encoded data generated by said second encoding unit, and re-encode the decoded data in accordance with a third parameter for determining a compression ratio;

a monitoring unit, adapted to monitor an encoded data amount generated by said first encoding unit while image data of an input page is encoded by said first and second encoding unit, and detect whether the encoded data amount has reached a target amount;

an updating unit adapted to, when said monitoring unit determines that the encoded data amount has reached the target amount, update the first parameter set in said first encoding unit with the second parameter set in said second encoding unit, update the second parameter set in said second encoding unit to further increase the compression ratio of said second encoding unit, and set a parameter, which corresponds to the updated second parameter, as the third parameter set in said third encoding unit; and a control unit adapted to, when the parameters are updated or set by said updating unit, store the encoded data generated by said second encoding unit before updating the second parameter, as encoded data generated by said first encoding unit after updating the first parameter, cause said third encoding unit to re-encode, in accordance with the third parameter, the encoded data generated by said second encoding unit before the second parameter is updated, store the re-encoded data generated by said third encoding unit as encoded data generated by said second encoding unit after the second parameter is updated, and store the encoded data generated by said first encoding unit after the first parameter is updated as succeeding encoded data.

* * * * *

UNITED STATES PATENT AND TRADEMARK OFFICE
CERTIFICATE OF CORRECTION

| | |
|---|---|
| PATENT NO. | : 7,106,911 B2 |
| APPLICATION NO. | : 10/171647 |
| DATED | : September 12, 2006 |
| INVENTOR(S) | : Ken-ichi Ohta |

It is certified that error appears in the above-identified patent and that said Letters Patent is hereby corrected as shown below:

<u>COLUMN 3</u>:

Line 20, "view" should read --views--;
 Line 49, "case," should read --cases,-- and
 Line 56, "an" should read --a--.

<u>COLUMN 7</u>:

Line 18, "regarded" should read --regarded as--.

<u>COLUMN 10</u>:

Line 17, "send" should read --sends--; and
 Line 65, "step" (second occurrence) should read --step Q2--.

<u>COLUMN 11</u>:

Line 34, "hold encoded" should read --hold as encoded--; and
 Line 38, "unit" should read --units--.

<u>COLUMN 12</u>:

Line 52, "realized" should read --realized with--.

<u>COLUMN 13</u>:

Line 52, "an" should read --a--.

<u>COLUMN 17</u>:

Line 11, "are a" should read --area--.

UNITED STATES PATENT AND TRADEMARK OFFICE
CERTIFICATE OF CORRECTION

PATENT NO. : 7,106,911 B2
APPLICATION NO. : 10/171647
DATED : September 12, 2006
INVENTOR(S) : Ken-ichi Ohta It is certified that error appears in the above-identified patent and that said Letters Patent is hereby corrected as shown below:

<u>COLUMN 18</u>:

Line 42, "en-coding" should read --re-encoding--.

<u>COLUMN 19</u>:

Line 27, "the a" should read --a--.

<u>COLUMN 20</u>:

Line 18, "an" (second occurrence) should read --a--.

Signed and Sealed this

Twenty-fifth Day of March, 2008

JON W. DUDAS
*Director of the United States Patent and Trademark Office*